United States Patent
Owens et al.

(10) Patent No.: US 10,790,700 B2
(45) Date of Patent: Sep. 29, 2020

(54) POWER GENERATION NECKLACES WITH FIELD SHAPING SYSTEMS

(71) Applicant: Spy Eye, LLC, Los Gatos, CA (US)

(72) Inventors: Thomas Llewellyn Owens, Saratoga, CA (US); Hawk Yin Pang, San Jose, CA (US)

(73) Assignee: Tectus Corporation, Saratoga, CA (US)

(*) Notice: Subject to any disclaimer, the term of this patent is extended or adjusted under 35 U.S.C. 154(b) by 215 days.

(21) Appl. No.: 15/984,182

(22) Filed: May 18, 2018

(65) Prior Publication Data

US 2019/0355512 A1    Nov. 21, 2019

(51) Int. Cl.
*H01F 27/42*    (2006.01)
*H01F 37/00*    (2006.01)
(Continued)

(52) U.S. Cl.
CPC .............. *H02J 50/10* (2016.02); *H01F 27/38* (2013.01)

(58) Field of Classification Search
CPC .......... H01F 27/38; H01F 38/14; H02J 50/10; H02J 50/005; H02J 2310/23; H02J 50/12;
(Continued)

(56) References Cited

U.S. PATENT DOCUMENTS 4,014,321 A    3/1977 March
4,577,545 A    3/1986 Kemeny
(Continued)

FOREIGN PATENT DOCUMENTS

CA    2280022    1/2001
WO    WO 2016/014118    1/2016
(Continued)

OTHER PUBLICATIONS

Chronos Vision GmbH, "Scleral Search Coils 2D/3D," 4 pages, [Online][Retrieved Feb. 28, 2019], Retrieved from the internet <http://www.chronos-vision.de/downloads/CV Product SSC.pdf>. (4 pages).
(Continued)

*Primary Examiner* — Rexford N Barnie
*Assistant Examiner* — Rasem Mourad
(74) *Attorney, Agent, or Firm* — Fenwick & West LLP

(57) ABSTRACT

An augmented reality system including a necklace and a contact lens display can be used to project information from the contact lens display onto the retina of the wearer's eye. In one example, the necklace generates a time-varying magnetic field (TVMF) that provides energy and information to the contact lens display via inductive coupling. The necklace can be configured to decrease the amount of energy absorbed by the body of the wearer and increase power transfer to the contact lens display. The necklace includes a conductive loop and one or more bucking loops that are positioned to increase transmitted energy while reducing the amount of energy absorbed by the human body. The amount of current travelling in one direction through the loops of the necklace is greater than the amount of current travelling in the opposite direction through the loops of the necklace. The necklace can include any number of signal generators and winding patterns for the loops.

20 Claims, 19 Drawing Sheets

(51) Int. Cl.
  *H01F 38/00* (2006.01)
  *H02J 50/10* (2016.01)
  *H01F 27/38* (2006.01)

(58) Field of Classification Search
  CPC .......... G02C 11/10; G02C 7/086; G02C 7/04; G02B 27/20
  See application file for complete search history.

(56) References Cited

U.S. PATENT DOCUMENTS

| | | | |
|---|---|---|---|
| 4,871,247 A | 10/1989 | Haynes | |
| 4,941,068 A | 7/1990 | Hofmann | |
| 5,331,149 A | 7/1994 | Spitzer et al. | |
| 5,467,104 A | 11/1995 | Furness et al. | |
| 5,638,218 A | 6/1997 | Oomura | |
| 5,638,219 A | 6/1997 | Medina et al. | |
| 5,682,210 A | 10/1997 | Weirich | |
| 5,699,193 A | 12/1997 | Monno et al. | |
| 5,712,721 A | 1/1998 | Large | |
| 5,726,916 A | 3/1998 | Smyth | |
| 6,120,460 A | 9/2000 | Abreu | |
| 6,181,287 B1 | 1/2001 | Beigel | |
| 6,215,593 B1 | 4/2001 | Bruce | |
| 6,307,945 B1 | 10/2001 | Hall | |
| 6,312,393 B1 | 11/2001 | Abreu | |
| 6,509,743 B1 | 1/2003 | Ferrero | |
| 6,570,386 B2 | 5/2003 | Goldstein | |
| 6,594,370 B1 | 7/2003 | Anderson | |
| 6,823,171 B1 | 11/2004 | Kaario | |
| 6,851,805 B2 | 2/2005 | Blum et al. | |
| 6,920,283 B2 | 7/2005 | Goldstein | |
| 7,088,235 B1 | 8/2006 | Carricut | |
| 7,137,952 B2 | 11/2006 | Leonardi et al. | |
| 7,359,059 B2 | 4/2008 | Lust et al. | |
| 7,562,445 B2 | 7/2009 | Lerch | |
| 7,626,562 B2 | 12/2009 | Iwasaki | |
| 7,758,187 B2 | 7/2010 | Amirparviz | |
| 7,835,056 B2 | 11/2010 | Doucet et al. | |
| 7,893,832 B2 | 2/2011 | Laackmann | |
| 7,931,832 B2 | 4/2011 | Pugh | |
| 8,077,245 B2 | 12/2011 | Adamo et al. | |
| 8,087,777 B2 | 1/2012 | Rosenthal | |
| 8,096,654 B2 | 1/2012 | Amirparviz et al. | |
| 8,348,422 B2 | 1/2013 | Pugh et al. | |
| 8,348,424 B2 | 1/2013 | Pugh et al. | |
| 8,394,660 B2 | 3/2013 | Kim et al. | |
| 8,398,239 B2 | 3/2013 | Horning et al. | |
| 8,430,310 B1 | 4/2013 | Ho et al. | |
| 8,441,731 B2 | 5/2013 | Sprague | |
| 8,446,341 B2 | 5/2013 | Amirparviz et al. | |
| 8,482,858 B2 | 7/2013 | Sprague | |
| 8,520,309 B2 | 8/2013 | Sprague | |
| 8,526,879 B2 | 9/2013 | Kristiansen et al. | |
| 8,579,434 B2 | 11/2013 | Amirparviz et al. | |
| 8,582,209 B1 | 11/2013 | Amirparviz | |
| 8,608,310 B2 | 12/2013 | Otis et al. | |
| 8,632,182 B2 | 1/2014 | Chen et al. | |
| 8,721,074 B2 | 5/2014 | Pugh et al. | |
| 8,764,185 B1 | 7/2014 | Biederman et al. | |
| 8,781,570 B2 | 7/2014 | Chuang et al. | |
| 8,786,520 B2 | 7/2014 | Legerton et al. | |
| 8,786,675 B2 | 7/2014 | Deering | |
| 8,798,332 B2 | 8/2014 | Otis et al. | |
| 8,827,445 B1 | 9/2014 | Wiser et al. | |
| 8,830,571 B1 | 9/2014 | Vizgaitis | |
| 8,870,370 B1 | 10/2014 | Otis et al. | |
| 8,874,182 B2 | 10/2014 | Etzkorn et al. | |
| 8,906,088 B2 | 12/2014 | Pugh et al. | |
| 8,911,078 B2 | 12/2014 | Meyers | |
| 8,922,898 B2 | 12/2014 | Legerton et al. | |
| 8,926,809 B2 | 1/2015 | Pletcher | |
| 8,931,906 B2 | 1/2015 | Huang et al. | |
| 8,960,898 B1 | 2/2015 | Etzkorn et al. | |
| 8,963,268 B2 | 2/2015 | Kim et al. | |
| 8,964,298 B2 | 2/2015 | Haddick et al. | |
| 8,971,978 B2 | 3/2015 | Ho et al. | |
| 8,985,763 B1 | 3/2015 | Etzkorn et al. | |
| 8,989,834 B2 | 3/2015 | Ho et al. | |
| 9,000,000 B2 | 4/2015 | Carroll | |
| 9,028,068 B2 | 5/2015 | Chang | |
| 9,039,171 B2 | 5/2015 | Groisman | |
| 9,040,923 B2 | 5/2015 | Sprague et al. | |
| 9,047,512 B2 | 6/2015 | Otis et al. | |
| 9,048,389 B2 | 6/2015 | Fu et al. | |
| 9,052,528 B2 | 6/2015 | Pugh et al. | |
| 9,052,533 B2 | 6/2015 | Pugh et al. | |
| 9,054,079 B2 | 6/2015 | Etzkorn | |
| 9,058,053 B2 | 6/2015 | Covington | |
| 9,063,351 B1 | 6/2015 | Ho et al. | |
| 9,063,352 B2 | 6/2015 | Ford et al. | |
| 9,111,473 B1 | 8/2015 | Ho et al. | |
| 9,130,099 B2 | 9/2015 | Robin | |
| 9,130,122 B2 | 9/2015 | Fu et al. | |
| 9,134,546 B2 | 9/2015 | Pugh et al. | |
| 9,153,074 B2 | 10/2015 | Zhou et al. | |
| 9,158,133 B1 | 10/2015 | Pletcher et al. | |
| 9,161,712 B2 | 10/2015 | Etzkorn | |
| 9,170,646 B2 | 10/2015 | Toner et al. | |
| 9,178,107 B2 | 11/2015 | Tsai et al. | |
| 9,192,298 B2 | 11/2015 | Bouwstra et al. | |
| 9,195,075 B2 | 11/2015 | Pugh et al. | |
| 9,196,094 B2 | 11/2015 | Ur | |
| 9,215,293 B2 | 12/2015 | Miller | |
| 9,217,881 B2 | 12/2015 | Pugh et al. | |
| 9,225,375 B2 | 12/2015 | Pugh et al. | |
| 9,244,285 B2 | 1/2016 | Chen et al. | |
| 9,271,677 B2 | 3/2016 | Leonardi | |
| 9,282,920 B2 | 3/2016 | Ho et al. | |
| 9,289,123 B2 | 3/2016 | Weibel et al. | |
| 9,289,954 B2 | 3/2016 | Linhardt et al. | |
| 9,298,002 B2 | 3/2016 | Border et al. | |
| 9,298,020 B1 | 3/2016 | Etzkorn et al. | |
| D754,861 S | 4/2016 | O'Driscoll et al. | |
| 9,307,905 B2 | 4/2016 | Varel et al. | |
| 9,310,626 B2 | 4/2016 | Pugh et al. | |
| 9,316,848 B2 | 4/2016 | Pugh et al. | |
| 9,326,710 B1 | 5/2016 | Liu et al. | |
| 9,332,935 B2 | 5/2016 | Etzkorn et al. | |
| 9,335,562 B2 | 5/2016 | Pugh et al. | |
| 9,341,843 B2 | 5/2016 | Border et al. | |
| 9,366,872 B2 | 6/2016 | Honea et al. | |
| 9,366,881 B2 | 6/2016 | Pugh et al. | |
| 9,389,433 B2 | 7/2016 | Pugh et al. | |
| 9,401,454 B2 | 7/2016 | Robin et al. | |
| 9,414,746 B2 | 8/2016 | Bergman et al. | |
| 9,425,359 B2 | 8/2016 | Tsai et al. | |
| 9,442,307 B2 | 9/2016 | Meyers | |
| 9,442,310 B2 | 9/2016 | Biederman | |
| 9,445,768 B2 | 9/2016 | Alexander et al. | |
| 9,523,865 B2 | 12/2016 | Pletcher | |
| 9,629,774 B2 | 4/2017 | Dayal | |
| 9,728,981 B2 | 8/2017 | Lee | |
| 9,810,926 B2 | 11/2017 | Sako | |
| 9,939,658 B1 | 4/2018 | Gutierrez | |
| 10,025,118 B1 | 7/2018 | Markus | |
| 10,278,644 B1 | 5/2019 | Etzkorn | |
| 2002/0084904 A1 | 7/2002 | De La Huerga | |
| 2002/0101383 A1 | 8/2002 | Junod | |
| 2003/0173408 A1 | 9/2003 | Mosher | |
| 2003/0179094 A1 | 9/2003 | Abreu | |
| 2004/0027536 A1 | 2/2004 | Blum | |
| 2005/0179604 A1 | 8/2005 | Liu | |
| 2006/0177086 A1 | 8/2006 | Rye | |
| 2006/0290882 A1 | 12/2006 | Meyers et al. | |
| 2007/0024423 A1 | 2/2007 | Nikitin | |
| 2007/0241986 A1 | 10/2007 | Lee | |
| 2008/0165072 A1 | 7/2008 | Schlager | |
| 2009/0058189 A1 | 3/2009 | Cook | |
| 2009/0066722 A1 | 3/2009 | Kriger et al. | |
| 2009/0072628 A1 | 3/2009 | Cook | |
| 2009/0244477 A1 | 10/2009 | Pugh | |
| 2010/0001926 A1 | 1/2010 | Amirparviz et al. | |
| 2010/0110372 A1 | 5/2010 | Pugh | |

(56) References Cited

U.S. PATENT DOCUMENTS

| | | |
|---|---|---|
| 2010/0136905 A1 | 6/2010 | Kristiansen |
| 2010/0234717 A1 | 9/2010 | Wismer et al. |
| 2010/0253476 A1 | 10/2010 | Poutiatine |
| 2010/0308749 A1 | 12/2010 | Liu |
| 2011/0034134 A1 | 2/2011 | Henderson |
| 2011/0221659 A1 | 9/2011 | King et al. |
| 2012/0105226 A1 | 5/2012 | Bourdeau |
| 2012/0262003 A1 | 10/2012 | Tetu |
| 2013/0009462 A1* | 1/2013 | Amano ............ B60L 5/005 307/9.1 |
| 2013/0050432 A1 | 2/2013 | Perez et al. |
| 2013/0100139 A1 | 4/2013 | Schliesser et al. |
| 2013/0242077 A1 | 9/2013 | Lin et al. |
| 2013/0270664 A1 | 10/2013 | Kim et al. |
| 2014/0016097 A1 | 1/2014 | Leonardi et al. |
| 2014/0063054 A1 | 3/2014 | Osterhout et al. |
| 2014/0081178 A1 | 3/2014 | Pletcher |
| 2014/0098226 A1 | 4/2014 | Pletcher |
| 2014/0120983 A1 | 5/2014 | Lam |
| 2014/0192311 A1 | 7/2014 | Pletcher et al. |
| 2014/0198128 A1 | 7/2014 | Hong et al. |
| 2014/0240665 A1 | 8/2014 | Pugh et al. |
| 2014/0252868 A1 | 9/2014 | Yamada |
| 2014/0285206 A1* | 9/2014 | West ............ G01V 3/107 324/333 |
| 2014/0292620 A1 | 10/2014 | Lapstun et al. |
| 2014/0371560 A1 | 12/2014 | Etzkorn |
| 2015/0005604 A1 | 1/2015 | Biederman et al. |
| 2015/0016777 A1 | 1/2015 | Abovitz et al. |
| 2015/0060904 A1 | 3/2015 | Robin et al. |
| 2015/0062533 A1 | 3/2015 | Toner et al. |
| 2015/0072615 A1 | 3/2015 | Mofidi |
| 2015/0088253 A1 | 3/2015 | Doll et al. |
| 2015/0123785 A1 | 5/2015 | Haflinger |
| 2015/0126845 A1 | 5/2015 | Jin et al. |
| 2015/0145095 A1 | 5/2015 | Kim et al. |
| 2015/0147975 A1 | 5/2015 | Li |
| 2015/0148628 A1 | 5/2015 | Abreu |
| 2015/0148774 A1* | 5/2015 | Yao ............ A61M 5/1723 604/504 |
| 2015/0150510 A1 | 6/2015 | Leonardi et al. |
| 2015/0171274 A1 | 6/2015 | Guo et al. |
| 2015/0173602 A1 | 6/2015 | Barrows |
| 2015/0223684 A1 | 8/2015 | Hinton et al. |
| 2015/0227735 A1 | 8/2015 | Chappell et al. |
| 2015/0234205 A1 | 8/2015 | Schowengerdt et al. |
| 2015/0235439 A1 | 8/2015 | Schowengerdt et al. |
| 2015/0235440 A1 | 8/2015 | Schowengerdt et al. |
| 2015/0235444 A1 | 8/2015 | Schowengerdt et al. |
| 2015/0235446 A1 | 8/2015 | Schowengerdt et al. |
| 2015/0235457 A1 | 8/2015 | Schowengerdt et al. |
| 2015/0235468 A1 | 8/2015 | Schowengerdt et al. |
| 2015/0235471 A1 | 8/2015 | Schowengerdt et al. |
| 2015/0241698 A1 | 8/2015 | Schowengerdt et al. |
| 2015/0243090 A1 | 8/2015 | Schowengerdt et al. |
| 2015/0261294 A1 | 9/2015 | Urbach et al. |
| 2015/0281411 A1 | 10/2015 | Markus et al. |
| 2015/0301338 A1 | 10/2015 | Van et al. |
| 2015/0305929 A1 | 10/2015 | Goldberg |
| 2015/0339857 A1 | 11/2015 | O'Connor et al. |
| 2015/0362750 A1 | 12/2015 | Yeager et al. |
| 2015/0362752 A1 | 12/2015 | Linhardt et al. |
| 2015/0372395 A1 | 12/2015 | Lavedas |
| 2015/0380461 A1 | 12/2015 | Robin et al. |
| 2015/0380988 A1 | 12/2015 | Chappell et al. |
| 2016/0006115 A1 | 1/2016 | Etzkorn |
| 2016/0011419 A1 | 1/2016 | Gao et al. |
| 2016/0018650 A1 | 1/2016 | Haddick et al. |
| 2016/0018651 A1 | 1/2016 | Haddick et al. |
| 2016/0018652 A1 | 1/2016 | Haddick et al. |
| 2016/0018653 A1 | 1/2016 | Haddick et al. |
| 2016/0030160 A1 | 2/2016 | Markus et al. |
| 2016/0049544 A1 | 2/2016 | Robin et al. |
| 2016/0066825 A1 | 3/2016 | Barrows et al. |
| 2016/0080855 A1 | 3/2016 | Greenberg et al. |
| 2016/0091737 A1 | 3/2016 | Kim et al. |
| 2016/0093666 A1 | 3/2016 | Gilet et al. |
| 2016/0097940 A1 | 4/2016 | Sako et al. |
| 2016/0113760 A1 | 4/2016 | Conrad et al. |
| 2016/0141449 A1 | 5/2016 | Robin et al. |
| 2016/0141469 A1 | 5/2016 | Robin et al. |
| 2016/0143728 A1 | 5/2016 | De et al. |
| 2016/0147301 A1 | 5/2016 | Iwasaki et al. |
| 2016/0154256 A1 | 6/2016 | Yajima et al. |
| 2016/0172536 A1 | 6/2016 | Tsai et al. |
| 2016/0172869 A1 | 6/2016 | Park |
| 2016/0204307 A1 | 7/2016 | Robin et al. |
| 2016/0223842 A1 | 8/2016 | Yun et al. |
| 2016/0243949 A1* | 8/2016 | Merkel ............ H02J 7/025 |
| 2016/0253831 A1 | 9/2016 | Schwarz et al. |
| 2016/0261142 A1 | 9/2016 | Park et al. |
| 2016/0270176 A1 | 9/2016 | Robin et al. |
| 2016/0270187 A1 | 9/2016 | Robin et al. |
| 2016/0276328 A1 | 9/2016 | Robin et al. |
| 2016/0299354 A1 | 10/2016 | Shtukater |
| 2017/0023793 A1 | 1/2017 | Shtukater |
| 2017/0042480 A1 | 2/2017 | Gandhi |
| 2017/0168322 A1 | 6/2017 | Toner |
| 2017/0188848 A1 | 7/2017 | Banet |
| 2017/0189699 A1 | 7/2017 | Dellamano |
| 2017/0231337 A1 | 8/2017 | Anderson |
| 2017/0234818 A1 | 8/2017 | Jesme |
| 2017/0255026 A1 | 9/2017 | Rakhyani |
| 2017/0270636 A1 | 9/2017 | Shtukater |
| 2017/0337461 A1 | 11/2017 | Jesme |
| 2017/0371184 A1 | 12/2017 | Shtukater |
| 2018/0036974 A1 | 2/2018 | Hahn et al. |
| 2018/0212313 A1 | 7/2018 | Harper |
| 2019/0074823 A1 | 3/2019 | Der |
| 2019/0173325 A1* | 6/2019 | Ichikawa ............ B60L 53/12 |

FOREIGN PATENT DOCUMENTS

| | | |
|---|---|---|
| WO | WO 2016/022665 | 2/2016 |
| WO | 2016150630 A1 | 9/2016 |
| WO | 2016195201 A1 | 12/2016 |
| WO | 2019069555 | 7/2018 |

OTHER PUBLICATIONS

Kao, H-L. et al., "DuoSkin: Rapidly Prototyping On-Skin User Interfaces Using Skin-Friendly Materials," ISWC '16, ACM, Sep. 12-16, 2016, 8 pages.

Kenyon, R.V., "A soft Contact Lens Search Coil for Measuring Eye Movements," Vision Research, vol. 25, No. 11, pp. 1629-1633, 1985.

Lupu, R.G. et al., "A Survey of Eye Tracking Methods and Applications," Gheorghe Asachi Technical University of Iasi, Aug. 29, 2013, pp. 71-86.

Paperno et al., A New Method for Magnetic Position and Orientation Tracking, IEEE Transactions on Magnetics, vol. 37, No. 4, Jul. 2001, pp. 1938-1940.

Umraiya, A, "Design of Miniaturized Coil System Using Mems Technology for Eye Movement Measurement," McGill University, Montreal, Aug. 2009, pp. i-69.

Avestruz, A-T. et al., "Single-Sided AC Magnetic Fields for Induction Heating," 39$^{th}$ Annual Conference of the IEEE, Nov. 10-13, 2013, pp. 5052-5057.

\* cited by examiner

POWER GENERATION NECKLACES WITH FIELD SHAPING SYSTEMS

BACKGROUND

1. Technical Field

One or more embodiments of this disclosure relate to reducing the energy absorbed by the human body when wearing an augmented reality system including a necklace and a contact lens display.

2. Description of Related Art

Augmented reality (AR) systems add computer-generated information to a person's view of the world around them. Untethered AR systems that are capable of wirelessly powering display systems are attractive for their portability and ease of use. Wirelessly delivering a sufficient level of power to the display system for a high-quality AR viewing experience while simultaneously minimizing the amount of power absorbed by the system user is a challenging problem.

BRIEF DESCRIPTION OF THE DRAWINGS

Embodiments of the disclosure have advantages and features which will be more readily apparent from the following detailed description and the appended claims, when taken in conjunction with the accompanying drawings, in which:

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION OF THE PREFERRED EMBODIMENTS

An augmented reality (AR) system can be used to assist a wearer of the system in everyday interactions by projecting AR images from a contact lens display onto the retina of the wearer's eye. In some embodiments, the contact lens display includes tiny projector(s), each one no larger than about one or two millimeters in any dimension, mounted inside a contact lens. The femtoprojector in the contact lens projects an image onto the user's retina. If the contact lens display is partially transparent, then the image from the femtoprojector is combined with the external scene viewed by the user though the contact lens, thus creating an augmented reality. The AR images from the femtoprojector are overlaid on the image of the external scene.

In some embodiments, the AR system includes an energy source that produces a time-varying magnetic field (TVMF) to provide energy to the femtoprojectors in the contact lens display. The contact lens display receives energy from the source to provide power to elements of the contact lens display (e.g., a femtoprojector). However, in some cases, the human body can absorb some of the energy of the TVMF produced by the source. Therefore, an energy source that minimizes the amount of energy absorbed by the human body can be beneficial.

Here, for example, a source that generates a TVMF can be a necklace worn about the neck of the wearer of the AR system. The necklace includes a time-varying current source (e.g., a signal generator generating an electrical signal) and a conductive coil which generates the TVMF. Various necklace configurations include a field shaping system such that magnetic fields produced by the necklace are stronger in one direction than another. Thus, the necklace reduces the amount of energy absorbed by a wearer of the necklace while increasing power provided to the contact lens display.

The figures and the following description relate to embodiments by way of illustration only. It should be noted that from the following discussion, alternative embodiments of the structures and methods disclosed herein will be readily recognized as viable alternatives that may be employed without departing from the principles of what is claimed.

Figure 1:
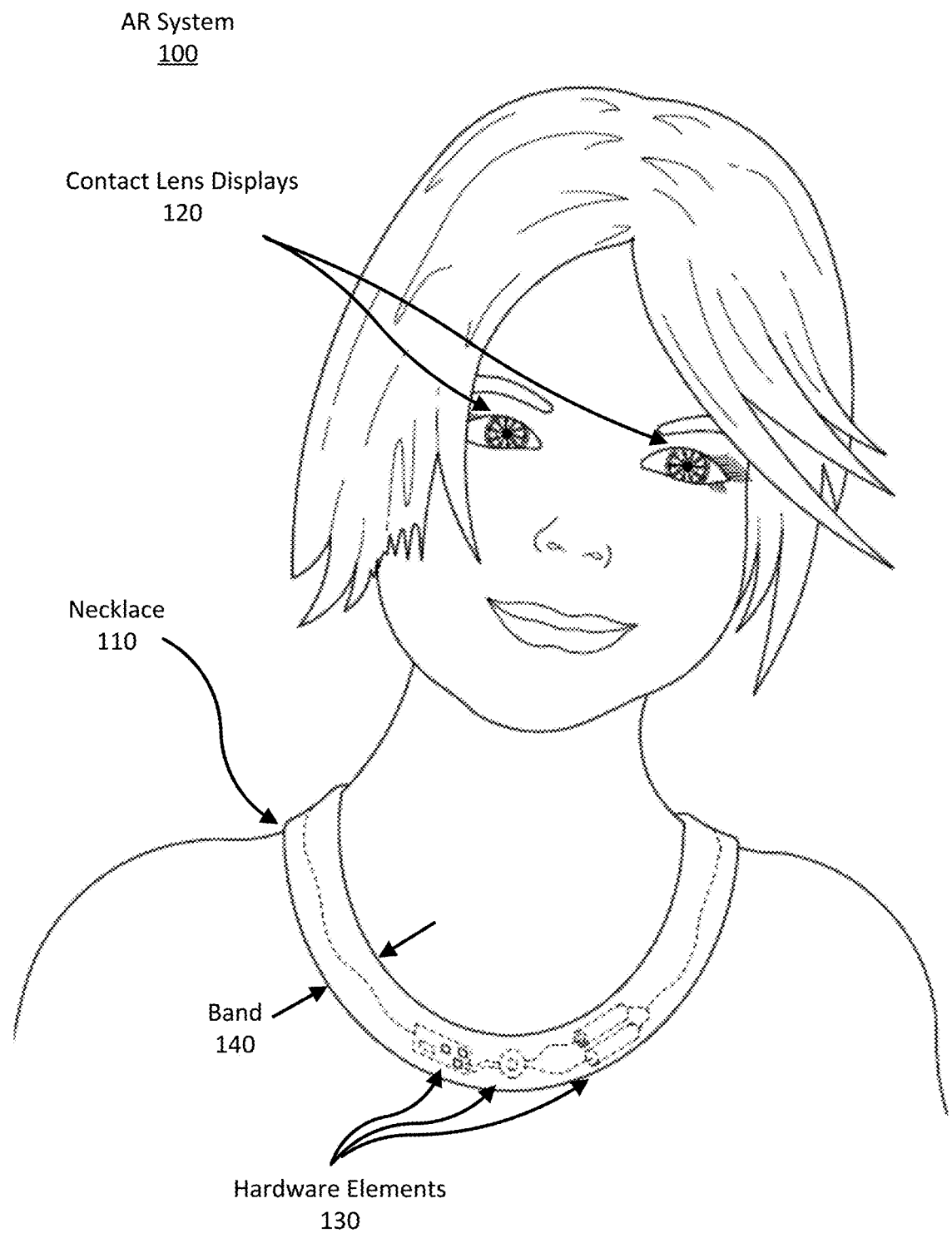
FIG. 1 shows a person wearing an augmented reality system including a necklace.

FIG. 1 shows a person wearing an augmented reality system 100 including a visible necklace 110. Even though the necklace 110 is in plain sight, it may be designed to look like ordinary jewelry and therefore attracts no special notice. In some configurations, the necklace can be hidden underneath the wearer's clothes. Whatever the design of the necklace 110, it does not alter one's impression of the person wearing it. Their appearance other than the addition of the necklace 110 is not affected by the AR system.

Furthermore, the AR system of FIG. 1 does not disturb the wearer. The contact lens displays 120 may also function as regular contact lenses providing refractive eyesight correction if required. The necklace 110 is lightweight and easily wearable. When the contact lens displays 120 are not showing images, the wearer is hardly conscious of the AR system 100. When the AR system 100 is displaying images, reacting to speech or receiving messages, it may provide functions like that of a smartphone but in a more natural way.

In FIG. 1, necklace 110 includes hardware elements 130 distributed about a band 140 of the necklace 110 which allows for a broader range of necklace designs suitable to a variety of aesthetic tastes. Generally, the band 140 includes a surface configured to be placed against the wearer of the necklace 110 when the necklace 110 is worn about the neck. In other configurations, the necklace includes hardware elements localized to a pendant of the necklace (as in FIG. 2A). Generally, the pendant may be an ornamental object hanging from the necklace 110 that is configured to enclose and conceal the hardware elements 130 of the AR system 100.

While the AR system 100 is illustrated with a necklace 110, in other embodiments the functions of the necklace 110 described herein can be integrated into another type of wearable device. As an example, the functionality of the necklace 110 can be embedded in a necktie, a scarf, a belt, the brim of a hat, the collar of a shirt, the hood of a jacket, the sleeve of a sweater, the front of a t-shirt, etc. Alternatively, the necklace 110 can be coupled to an external electronic device (not pictured) such as a smart phone and the coupled electronic device may facilitate functionality of the AR system 100.

Figure 2A:
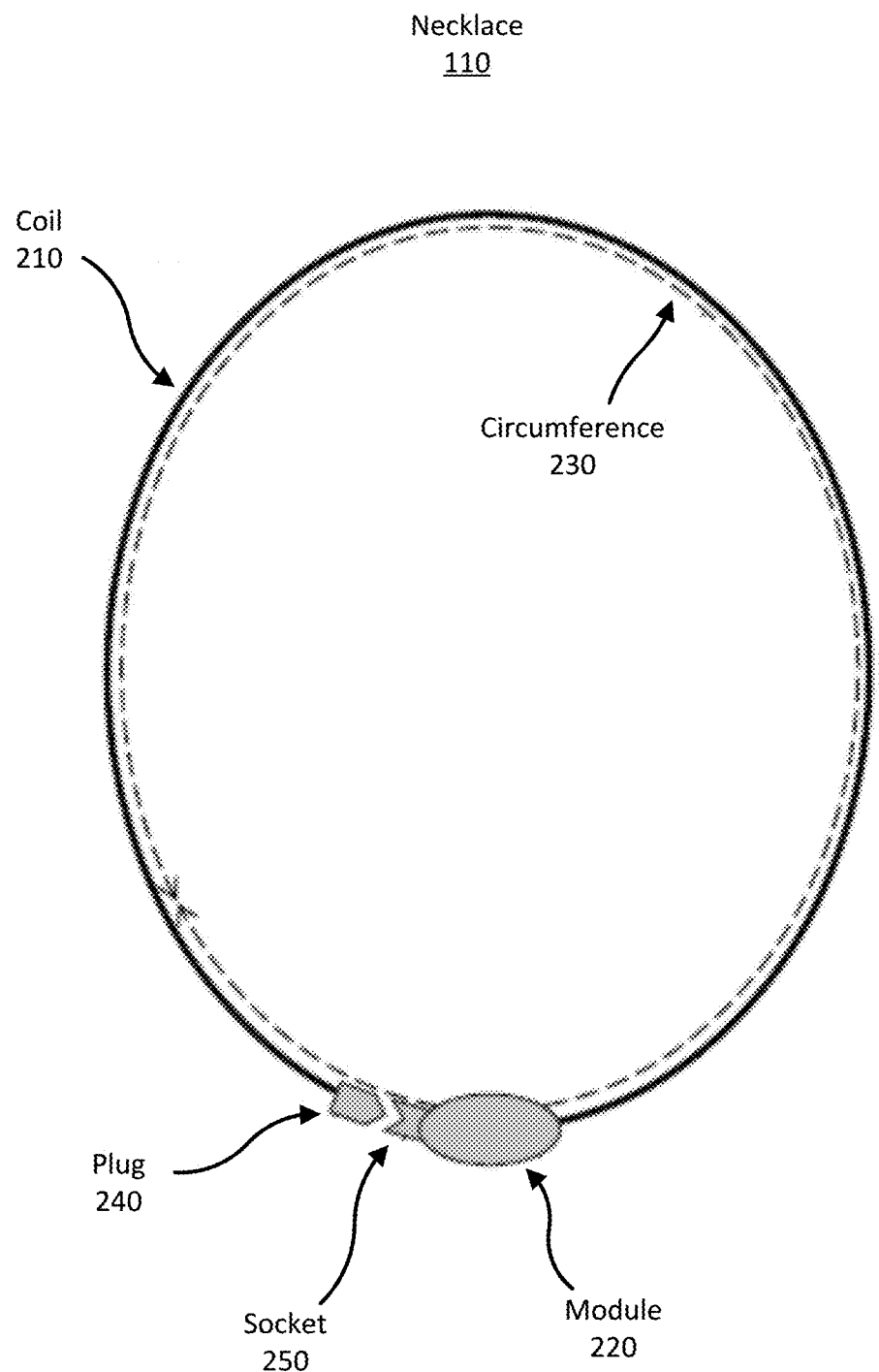
FIG. 2A shows a necklace of an augmented reality system.

FIG. 2A shows a necklace 110 of an unobtrusive augmented reality system 100. In the illustrated embodiment, the necklace 110 includes a coil 210 of conductive material such as an insulated wire and an electronic module 220. Module 220 contains the hardware elements 130 for controlling the augmented reality system 100. In some configurations, the module 220 is a pendant of the necklace. In other configurations, the necklace 110 does not include a module 220 and the hardware elements 130 are distributed about the circumference 230 of the necklace (i.e., as in FIG. 1). The conductive coil 210 and module 220 can be incorporated into the band 140 of the necklace.

Additionally, the number of conductive turns (i.e., loops) in necklace coil 210 is chosen considering factors such as power requirements of contact lens displays 120, operating frequency, etc. The number of loops in necklace coil 210 can be, for example, between 1 and 200 loops. In some configurations, an unlicensed frequency band can be used to couple the necklace 110 to the contact lens display 120, but any other frequency can be used. In one example, the system can use an industrial, scientific, and medical radio band (ISM).

Furthermore, conductors in the coil 210 may extend around the circumference 230 of the necklace 110 for one, two, three, or more loops. These loops may be connected or disconnected with a plug 240 and socket 250 when putting the necklace 110 on or taking it off. Connecting the plug 240 to the socket 250 allows data and power to be transmitted between the necklace 110 and contact lens display 120, and disconnecting the plug 240 from the socket 250 prevents data and power from being transmitted between the necklace 110 and contact lens display 120. Generally, the coil 210 is configured to be worn around a user's neck as a necklace 110 when the plug 240 and socket 250 are connected. In some configurations, the necklace 110 does not include a plug 240 and socket 250 but still allows for data and power to be transmitted between the necklace 110 and contact lens display 120. In these configurations, any other means of controlling data and power transfer can be included (e.g., a switch, a button, etc.).

In various embodiments, as a wearer of necklace 110 operates the AR system 100 and moves through the environment, the orientation of necklace 110 may vary with that movement (i.e., the shape of the band of necklace may change, relative orientations of the hardware elements 130 in necklace 110 change, etc.).

Figure 2B:
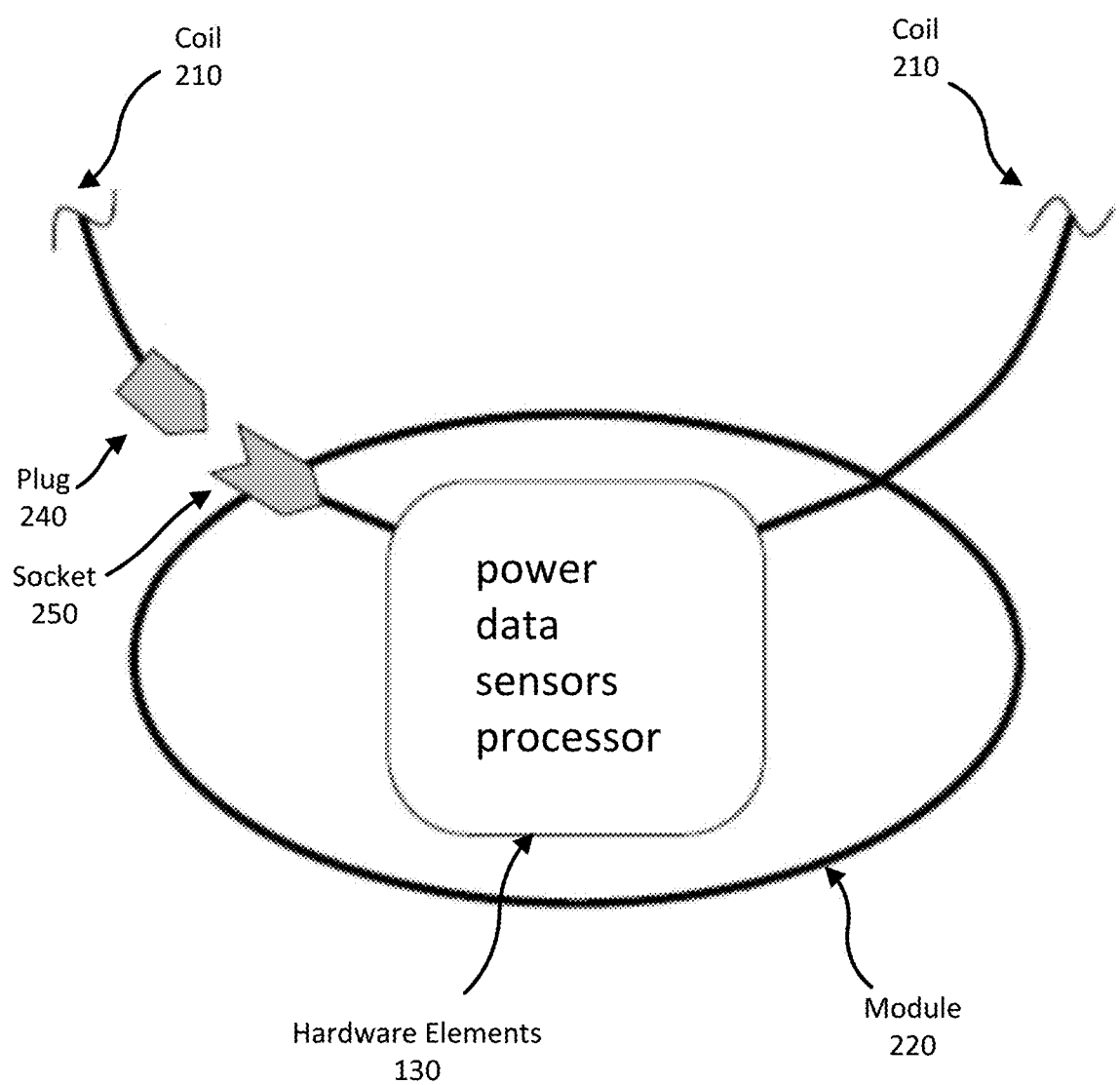
FIG. 2B shows a representation of the control electronics contained within the necklace of an augmented reality system.

FIG. 2B shows a necklace 110 of the augmented reality system 100. In the illustrated embodiment, the necklace 110 includes a module 220 that may have an exterior appearance of jewelry or a fashion accessory. However, the module 220 may contain additional hardware elements 130 such as: a power source such as a battery; a modulator to drive a radio-frequency current in the necklace coil; a data modem to encode data on the radio-frequency signal; sensors such as microphones, cameras, inertial sensors, GPS receivers, barometric pressure sensors, etc.; a cellular radio; a Wi-Fi radio; a Bluetooth radio; a graphics processing unit; and/or, a microprocessor and memory. In other configurations, the hardware elements 130 included in module 220 may be distributed about the necklace band 140.

When the hardware elements 130 produce a radio-frequency current (or any other alternating current) in the necklace coil 210, power may be inductively coupled into a coil embedded in a contact lens display 120. Data may also be transmitted to the contact lens display 120 by modulating the radio-frequency current in the necklace coil 210. Amplitude, frequency, and phase modulation are examples of modulation schemes that may be employed. For example in frequency shift keying, a pair of discrete frequencies are used to indicate logical "0" and logical "1".

The hardware elements 130 may include a microphone (or multiple microphones) to sense voices and other sounds. The wearer of an augmented reality system 100 may control the system by speaking to it, for example. The system 100 may also include hardware elements 130 such as a speaker and/or wireless connection to earphones. The system 100 may be controlled via a touch sensor in the necklace or via gestures detected by hardware elements 130 including radar (e.g. 60 GHz radar), ultrasonic and/or thermal sensors.

Additional hardware elements 130 such as inertial (acceleration and rotation rate) sensors, coupled with a barometric pressure sensor and a GPS receiver may provide position and velocity data to the AR system 100. Further, cellular radio and/or Wi-Fi radio hardware elements 130 can provide connections to voice and/or data networks. Finally, a processor, graphics processing unit and memory can run applications and store data. Broadly, the hardware elements 130 are configured to transmit data and images for projection by a contact lens display 120 onto a wearer's retina.

When the AR system 100 is connected to an external electronic device, any of the sensors, processors and other components mentioned above may be located in the electronic device. Alternatively, the hardware elements 130 of the necklace 110 may connect to an electronic device wirelessly or it may connect physically via a plug-and-socket connector or another type of connector.

Figure 3A:
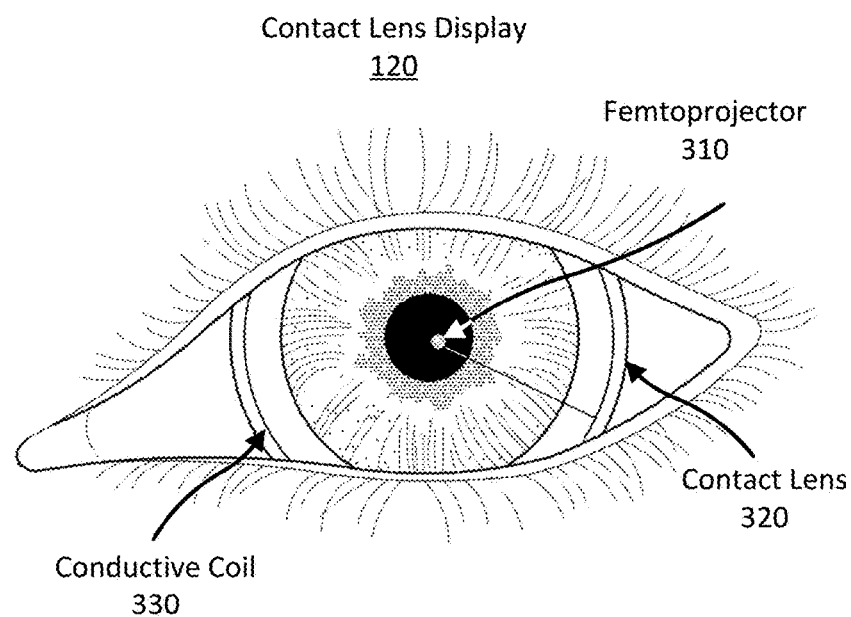
FIG. 3A shows a plan view of a contact lens display mounted on a person's eye.

FIG. 3A shows a contact lens display 120 mounted on a person's eye. The contact lens display 120 includes a femtoprojector 310 mounted in a contact lens 320, and a conductive coil 330 near the edge of the contact lens 320 for receiving power and data wirelessly from the necklace 110 as in FIGS. 2A-2B. The femtoprojector 310 may include electronics for harvesting power from the conductive coil 330 in the contact lens 320, processing data transmitted to the contact lens 320, and driving a light emitter inside the femtoprojector 310. The femtoprojector 310 projects images on a wearer's retina.

Figure 3B:
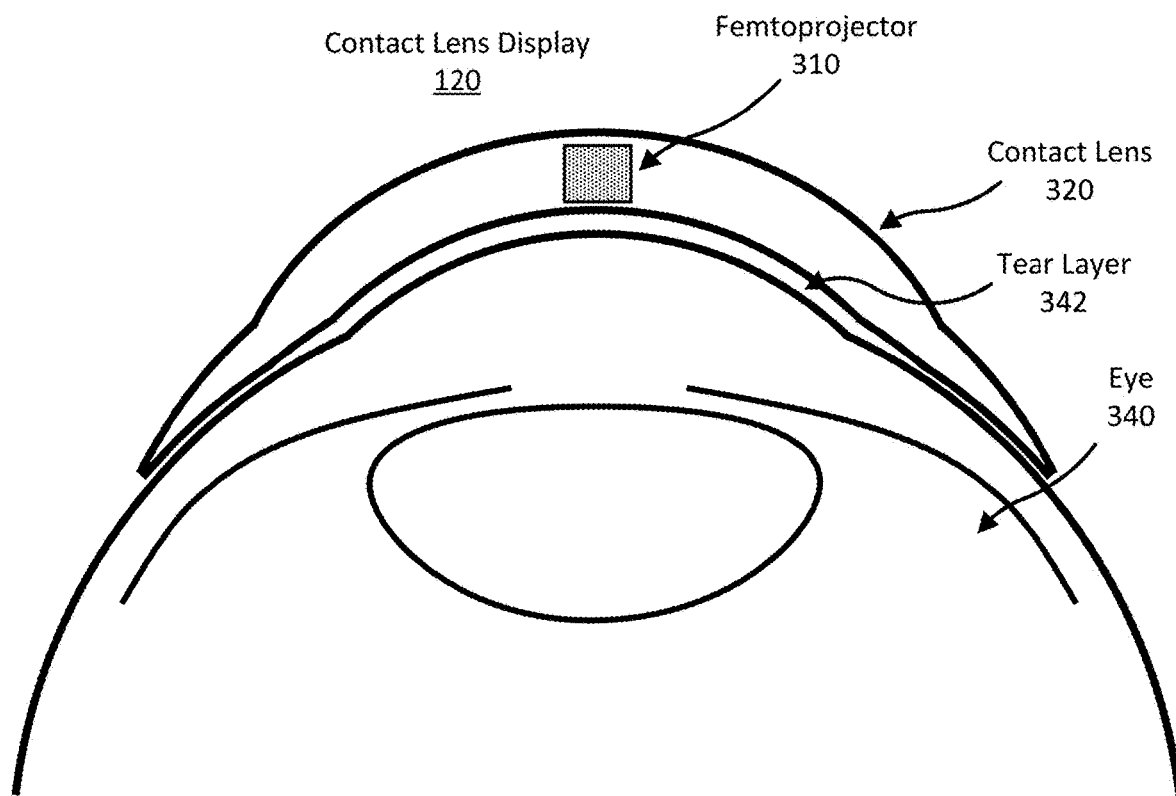
FIG. 3B shows a cross-sectional view of a contact lens display mounted on a person's eye.

FIG. 3B shows a cross-sectional view of a contact lens display 120 containing a femtoprojector 310 in a contact lens 320. FIG. 3B shows an embodiment using a scleral contact lens but the contact lens does not have to be scleral (i.e., it could be a soft contact lens). The contact lens 320 is separated from the cornea of the user's eye 340 by a tear layer 342. The contact lens display 120 has an outer surface facing away from the eye 340 and an inner surface contacting the tear layer 342. Generally, the femtoprojector 310 is positioned between the front surface and the back surface of the contact lens 320. The contact lens 320 preferably has a thickness that is less than 2 mm, and the femtoprojector 310 preferably fits in a 2 mm by 2 mm by 2 mm volume. The contact lens 320 is comfortable to wear and maintains eye health by permitting oxygen to reach the user's eye 340.

Figure 3C:
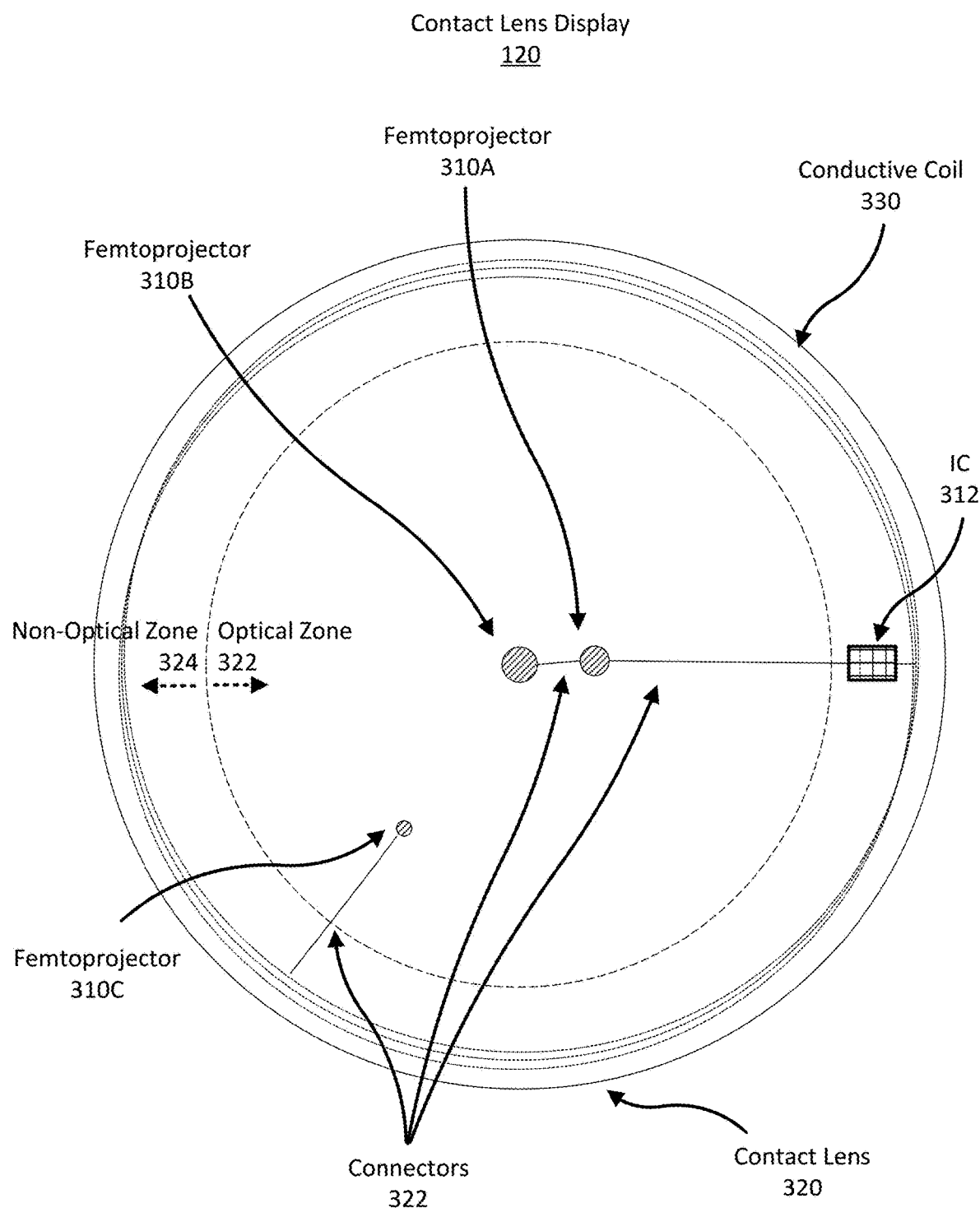
FIG. 3C shows a plan view of the contact lens display of FIG. 3A in more detail.

FIG. 3C shows the contact lens display 120 of FIGS. 3A-3B in more detail. FIG. 3C shows a plan view of a contact lens display 120 with multiple femtoprojectors 310A-310C in a contact lens 320. The conductive coil 330 in the contact lens 320 may have between about 1 and about 200 turns which extend along a peripheral region of the contact lens display 120. In other configurations, the conductive coil 330 can be arranged in a cylindrical coil or any other looped shape. The conductive coil 330 is connected to the femtoprojectors 310 and other electronics via embedded connectors 332. The femtoprojectors 310 are located in a central region of the contact lens display 120 which is surrounded by the conductive coil 330. The femtoprojector 310, conductive coil 330, and electronics are enclosed in lens material such that the lens feels to a wearer like a conventional contact lens. The contact lens 320 is between about 6 mm and about 25 mm in diameter and preferably between about 8 mm and about 16 mm in diameter.

The ratio of the contact lens 320 diameter to femtoprojector 310 lateral size can be roughly 25:1 for the largest femtoprojector. This ratio is normally between about 15:1 and 30:1, but may be as small as 5:1 or as large as 50:1. FIG. 3C shows three femtoprojectors 310A-C in the contact lens 320, but many femtoprojectors, or only one, may be mounted in such a contact lens 320. Eye-mounted displays with as many as 49 femtoprojectors in a contact lens 320 have been proposed. If there is only one femtoprojector 310 in a contact lens 320, it need not be in the center of the lens.

The femtoprojectors 310 in FIG. 3C are also shown as different sizes. The entire display, made up of all the femtoprojectors 310, may generate variable resolution images commensurate with the eye's natural acuity, reducing the total number of pixels required compared to displays of equal resolution and field of view that are not eye-mounted. For example, a 400,000 pixel eye-mounted display using variable resolution can provide the same visual experience as a fixed external display containing tens of millions of discrete pixels.

In FIG. 3C, the contact lens 320 is roughly divided by the dashed circle into an optical zone 322 and a non-optical zone 324. Components in the optical zone 322 may be in the optical path of the eye 340, depending on how far open the pupil is. Components in the non-optical zone 324 fall outside the aperture of the eye 340. Accordingly, active optical elements are generally positioned in the optical zone 322 and non-active optical elements are positioned in the non-optical zone 324. For example, femtoprojectors 310 are within the optical zone 322 while the conductive coil 330 is in the non-optical zone 324. Additionally, the contact lens 320 may also contain other components positioned in the non-optical zone 322 for data processing, data transmission, and power recovery and/or positioning. As an example, an integrated circuit (IC) 312 is positioned in the non-optical zone 324 and is connected to the femtoprojectors 310.

The contact lens display 120 can also include other components such as antennae or optical/infrared photodetectors, data storage and buffering, controls, and possibly also on-lens processing components. The contact lens display can include positioning components such as accelerometers and fiducial or other structures used for eye tracking and head tracking. The contact lens display 120 can also include data processing components can include a microprocessor or other data processing elements.

There are many ways in which the functions of receiving power and data and projecting the data onto the retina of a wearer can be configured with an eye-mounted display(s) to create embodiments of eye-mounted display systems. Portions of these subsystems may be external to the user, while other portions may be worn by the user in the form of a headpiece or glasses. Components may also be worn on a belt, armband, wrist piece, necklace or other types of packs. Some components may be included in external devices such as a watch, a cell-phone, a laptop, etc.

Referring back to FIG. 1, the necklace 110 may generate a time-varying magnetic field (TVMF), or any other electromagnetic field, and transmit power and/or data to the contact lens display 120 via inductive coupling. Generally, the necklace 110 is worn around a user's neck and is close proximity to the wearer's skin during operation of the AR system 100. As such, some portion of the energy generated by the necklace 110 is absorbed by the user's body rather than being transmitted to the contact lens display 120. The specific absorption rate (SAR), in this context, is a measure of the amount of energy absorbed by the user's body when using the necklace 110 of the AR system 100. More generally, SAR is a measure of the rate at which energy is absorbed by the human body when exposed to a radio frequency (RF) electromagnetic field. SAR is defined as the power absorbed per unit mass of tissue and has units of watts per kilogram (W/kg). SAR can be measured as an average over the whole body or over a small sample volume (e.g., a small mass of tissue). SAR can be defined as:

$$SAR = \frac{1}{V}\int_{sample} \frac{\sigma(r)|E(r)|^2}{\rho(r)} dr \qquad (1)$$

where $\sigma$ is the sample electrical conductivity, E is the RMS electric field created by the changing magnetic field generated by the necklace, $\rho$ is the sample density (e.g., tissue density), and V is the volume of the sample (e.g., sample tissue volume). Therefore, generally, decreasing the amount of energy absorbed by the tissue (i.e., $E^2(r)$) decreases the SAR in the human body.

In some regions of the world, governments impose safety limitations to the amount of SAR that an electronic device can impose on a human body. For example, in America, the Federal Communications Commission limits SAR generation by an electronic device to 1.6 W/kg taken over 1 g of tissue. Similarly, governments can impose safety limitations for long term environmental exposure to RF electromagnetic fields. For example, again in America, the limit of SAR exposure for the general public is 0.08 W/kg across the body and 0.40 W/kg across the body for occupational hazards. Accordingly, necklace 110 configurations that reduce energy absorption for the wearer of the AR system 100 (i.e., decreases the SAR) allow it to be used as an everyday accessory.

Figure 4A:
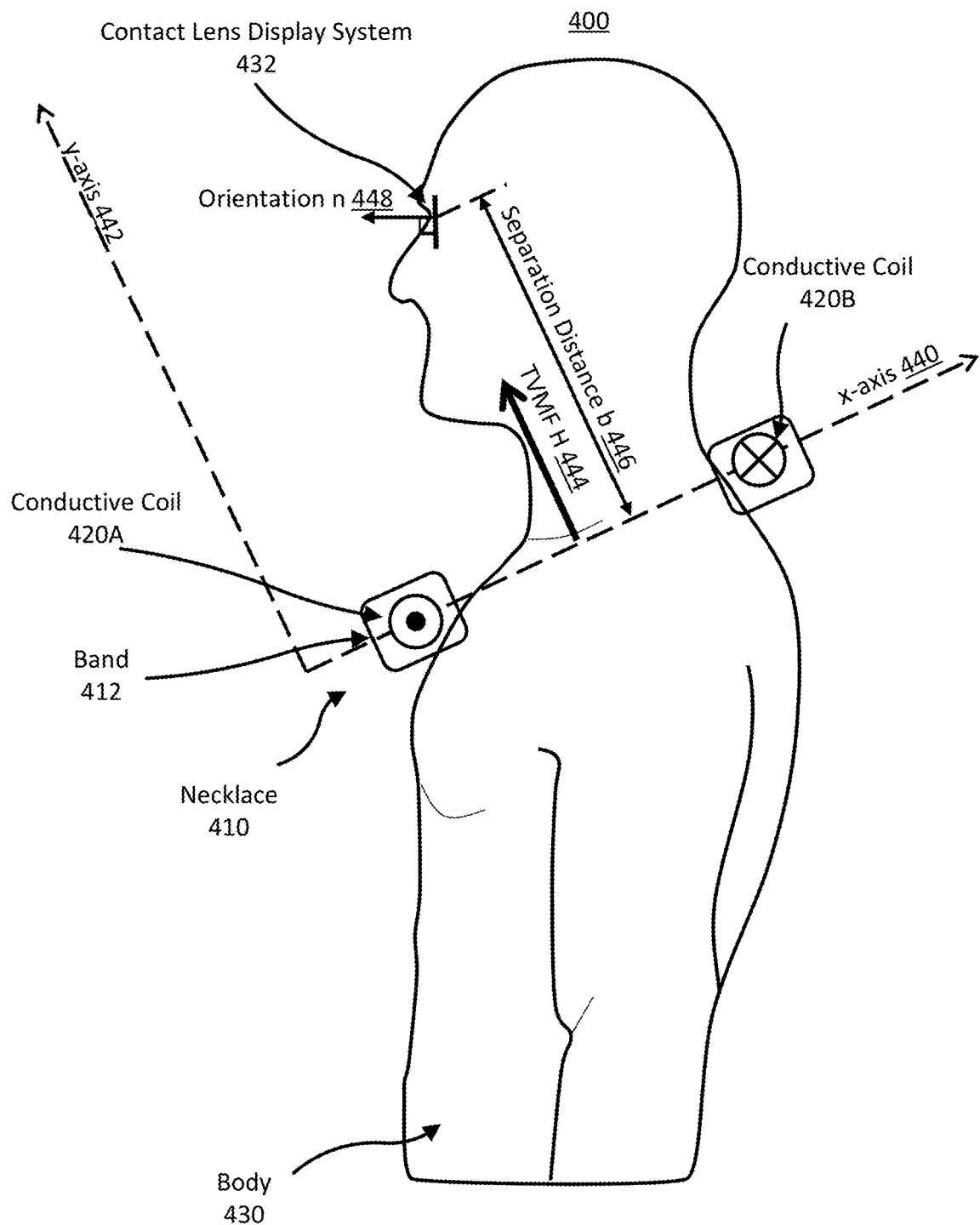
FIG. 4A is a diagram of an augmented reality system including a single conductive coil.

FIG. 4A is a diagram 400 of an augmented reality system 100 including a single conductive coil. A wearer is wearing the necklace on their body and the necklace includes a conductive coil within the band. The necklace is illustrated in cross section because it encircles the neck when worn on the body. In various configurations, the band 412 of necklace 410 can contact the body 430 at any number of points depending on the configuration of the necklace 410. Thus, in this example, selection of the illustrated x-axis 440 is for clarity, but the x-axis 440 can be any axis that connects two points of the conductive coil 420 on opposing sides of the necklace 410. Further, in diagram 400, the band 412 of the necklace 410 and conductive coils 420 are not necessarily drawn to scale. That is, the conductive coils 410 and band 412 of necklace 410 can be any size relative to the body 430 but the necklace 410 is, generally, similar in size to a normal necklace that a person may wear.

The necklace 410 is configured to transmit energy to a contact lens display system 432 of the augmented reality system 100 via inductive coupling between the necklace 410 and the contact lens display 432. The necklace 410 includes a signal generator which generates an electrical signal that passes through the conductive coil 420. The conductive coil 420 can convert the time varying current into a TVMF as the current passes through the conductive coil 420. The generated TVMF inductively couples the necklace 410 around the wearer's neck 430 to the contact lens display 432 on the wearer's eye. The contact lens display 432 includes a conductive coil (e.g., conductive coil 330) that can receive power and data from the inductively coupled necklace 410.

In the illustrated example, the generated electrical signal travels in a circular motion through the conductive coil looped around the wearer's neck. Therefore, the direction of the electrical signal is out of the plane of the page of near the wearers sternum (shown as an "•" within the cross-section) and into the plane of the page for the near the base of the wearer's neck (shown as an "x" within the cross-section). The direction of the illustrated current flow alternates over time and, accordingly, the illustrated direction of current is arbitrary and could be in the opposite direction. Notably, when illustrated herein, the direction of current is at a single point in time, however, over time, the illustrated direction can alternate.

In the illustrated example, direction of the current flow through the conductive coil 420 generates a TVMF parallel to y-axis 442 that is orthogonal to the x-axis. The TVMF 444 is represented by a magnetic field vector (e.g., an arrow). The length of the magnetic field vector is related to the strength of the generated TVMF 444 where a longer magnetic field vector represents a larger TVMF 444. Over time, the direction the time-varying current travels through the conductive coil 420 changes and the magnetic field vector can be in the opposite direction to the illustrated magnetic field vector. More generally, the magnetic field vector can be any magnitude or direction such that it represents the TVMF 444 generated by the time varying current flowing through the conductive coil 420 of the necklace 410.

Generally, the efficiency of power transfer between the necklace 410 and the contact lens display 432 is related to the orientation (illustrated by arrow n 448) and separation distance (illustrated by arrow b 446) of the contact lens display 120 relative to the generated TVMF $\vec{H}$ 444. Energy transmission efficiency is highest when the orientation n̂ 448 of the contact lens is parallel to the TVMF $\vec{H}$ 444 at the separation distance b 446 such that the generated TVMF $\vec{H}$ 444 passes through the conductive coil of the contact lens display 432. That is, transmission efficiency is highest when the orientation n 448 is parallel to the y axis 442 and located near the center point of the conductive coil 420.

Figure 4B:
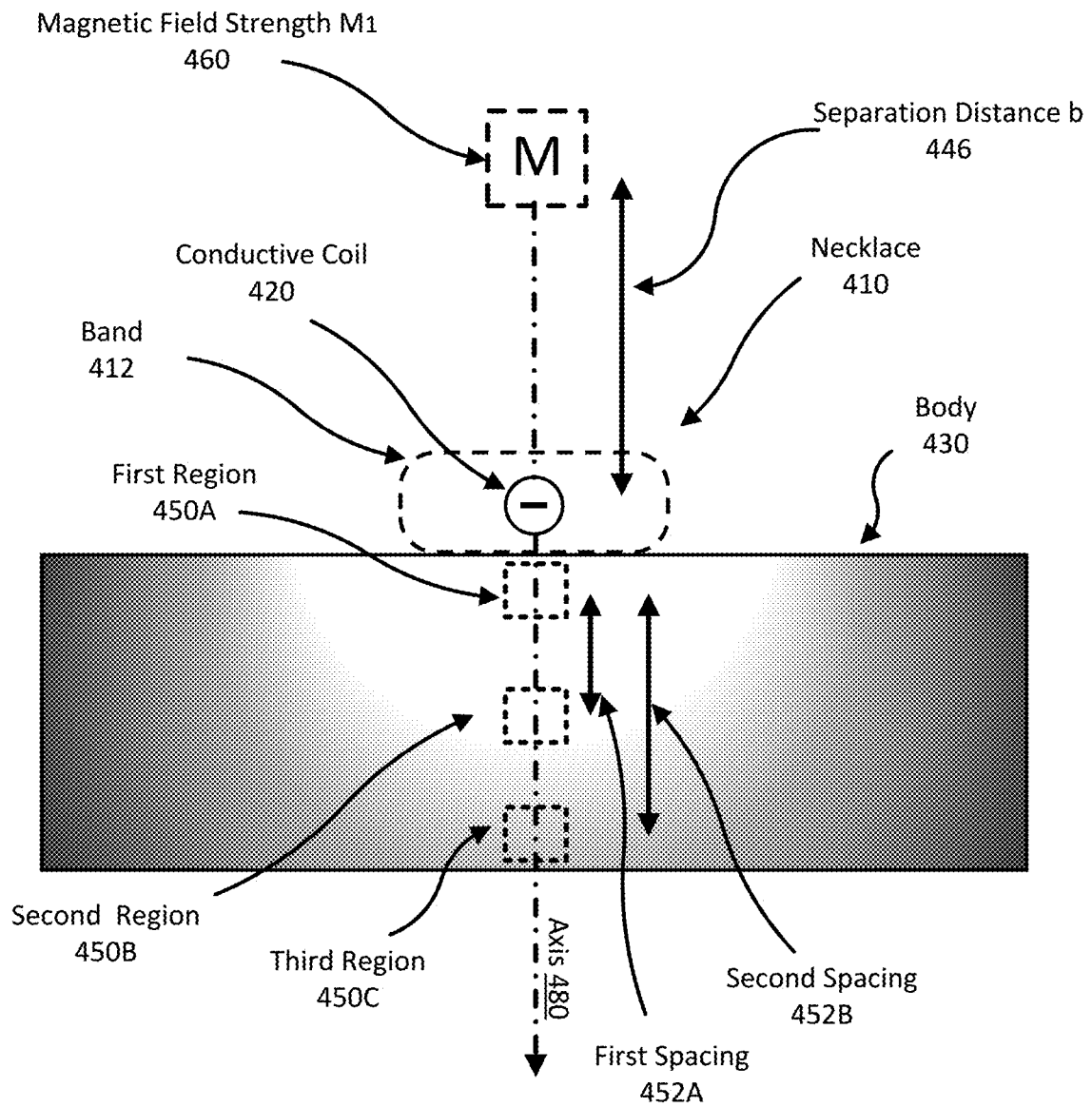
FIG. 4B a cross-sectional illustration of a necklace including a single conductive coil on a human body and the corresponding SAR generated by the necklace while it operates as part of an AR system.

FIG. 4B is a cross-sectional illustration of the necklace 410 on the wearers body 430 and the corresponding SAR generated by the necklace 410 while it operates as part of an AR system 100. In the illustrated example, the circle represents a cross-section of a conductive coil 420 of the necklace 410 within the band 412. The lower block represents a cross-section of the body 430 underneath the necklace 410 when worn by a user of AR system 100. The variation in shading within the block represents the SAR throughout the illustrated body 430 cross-section (e.g., high SAR is lightly shaded). As shown, the SAR is highest in a first region 450A, lower in the second region 450B, and still lower in the third region 450C. The SAR decreases due to the increasing separation from the conductive coil 420 (e.g., first spacing 452A and second spacing 452B) Generally, the magnitude of the SAR in the human body 430 decreases radially away from the point of contact between the conductive coil 420 and the body 430.

In this example, the bounded M 460 represents a point in space at a separation distance 446 from the body 430 at which the generated TVMF has strength $M_1$. The separation distance b 446 is the distance between the conductive coil 420 and contact lens display 432 of the AR system 100. For a typical user of the AR system 100, the separation distance b 446 is approximately between 15 and 50 cm, but can be any distance between a necklace 110 and an eye 340 of the necklace wearer. In general, the necklace 110 of the AR system 100 is configured to maximize the strength of the generated TVMF 440 at a separation distance b 446 while decreasing energy absorbed by the human body.

Figure 4C:
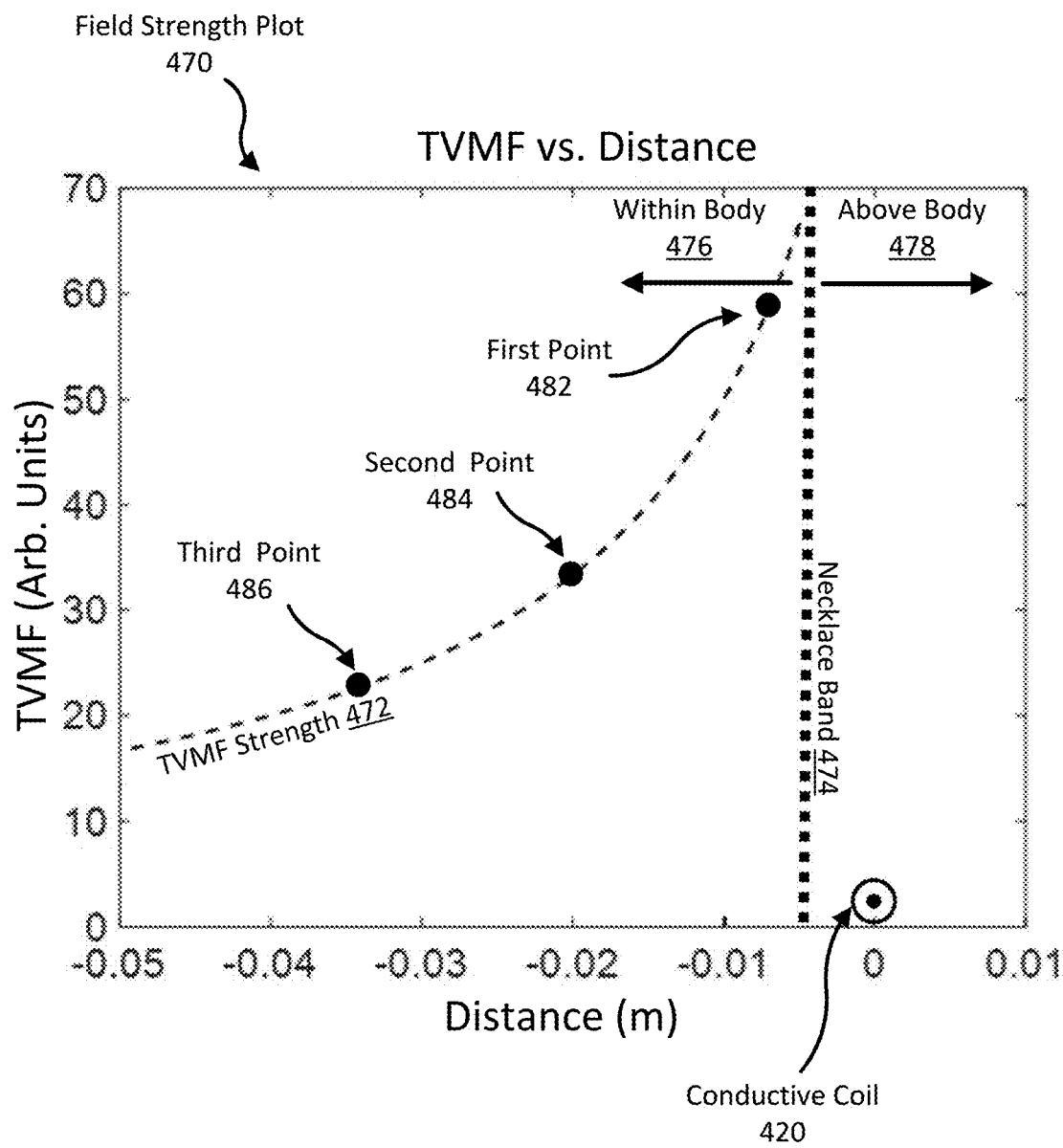
FIG. 4C is a field strength plot giving the strength of a generated TVMF in a wearers body as a function of distance from the conductive coil.

FIG. 4C is a field strength plot 470 giving the strength of the generated TVMF (dashed line 472) in the wearers body 430 as a function of distance from the conductive coil 420. The SAR in the body is proportional to the square of the TVMF strength 472. In this example, the conductive coil 420 of the necklace 410 is indicated by the circle with a "•" at a distance of 0.0 m. The bottom surface of the band 412 that is in contact with the wearers 430 body is indicated by the dashed line 474. In this plot 470, the bottom surface 474 is approximately 0.005 m beneath the conductive coil 420, but can be any other distance. Therefore, areas of plot 470 to the left 476 of the bottom surface 474 are within the body 430 and areas of the plot 470 to the right 478 of the bottom surface 474 are outside the body 430. Here, plot 470 indicates that the TVMF strength 472, and the generated SAR, decreases with increasing separation from the conductive coil 420.

Figure 4D:
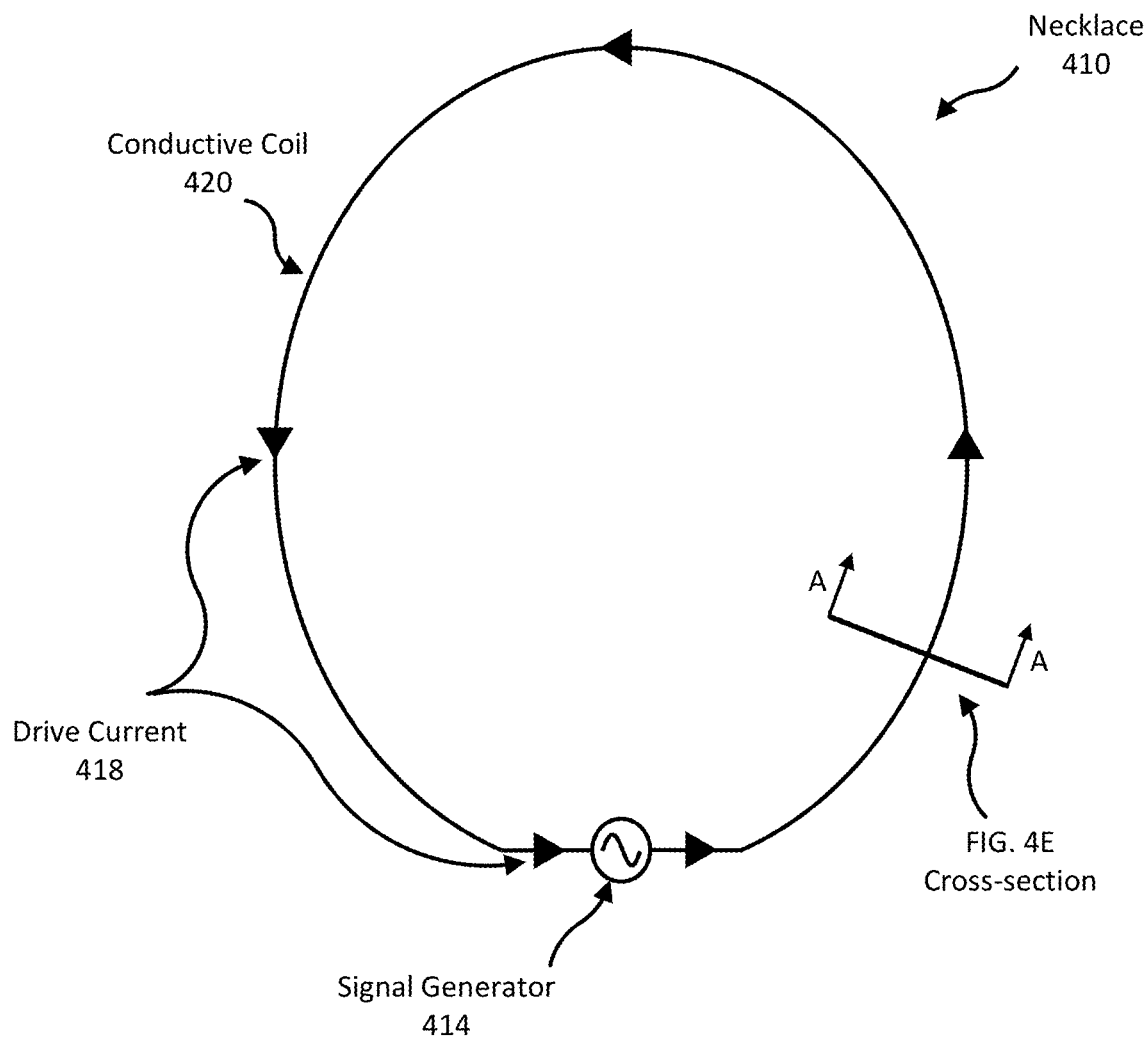
FIG. 4D is an example diagram for a necklace that generates a TVMF to provide power to a contact lens display via inductive coupling.

FIG. 4D is an example diagram for a necklace 410 that generates a TVMF to provide power to a contact lens display 432 via inductive coupling. In this example embodiment, the necklace 410 includes a signal generator 414 and a conductive coil 416. The conductive coil 420 shows only a single loop but can include any number of loops. The conductive coil 420 is within the necklace band (not pictured, for clarity) and can encircle a wearer's neck when worn as part of augmented reality system 400. The conductive coil 420 has an inherent inductance $L_{EQ}$ based on the size, shape, number of turns, and material of the conductive coil. In various other embodiments, the necklace 410 can include additional or fewer hardware elements 130. For example, the necklace can include additional capacitors, inductors, control circuits, etc.

The signal generator 414 generates a drive current (indicated by arrows 418) that travels through the conductive coil 420. In this example, the drive current 418 travels in a counter-clockwise direction through the conductive coil 420 and generates a TVMF out of the plane of the page. In configurations where the drive current 418 is a time varying electrical signal, the direction and magnitude of the time varying current can change over time. Thus, the indicated direction of the drive current 418 is arbitrary and can be in the opposite direction. Accordingly, the TVMF generated from the time varying drive current 418 travelling around the conductive coil 420 is either out of (via counterclockwise drive current 418, as shown), or into (via clockwise drive current 418, not shown), the plane of the page in the configuration of FIG. 4D. During everyday use of the necklace 410, the orientation of the necklace 410 may change and the generated TVMF may not be orthogonal to the plane of the page.

Figure 4E:
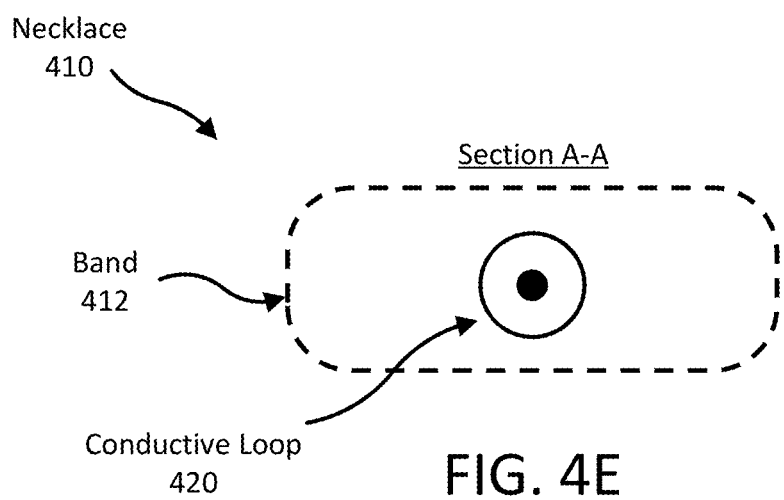
FIG. 4E is a cross-section of the necklace of FIG. 4D.

FIG. 4E is a cross-section of the necklace 410 of FIG. 4D illustrating the conductive coil 420 within the band 412 of the necklace 410. The dot within the conductive coil 416 indicates the direction of the drive current in the conductive coil is out of the plane of the page of FIG. 4E. Given this configuration, the generated TVMF from the necklace 410 counter-clockwise in the plane of the page of FIG. 4E.

Various necklace configurations include a field shaping system such that magnetic fields produced by the necklace are stronger in one direction than another." Therefore, a necklace 110 with a shaping system can be used to increase power transmitted to a contact lens display 120 while decreasing energy absorbed by the body. Accordingly, the necklace 110 includes one or more conductive loops of a conductive coil (hereafter, "conductive loop") and one or more conductive loops of a shaping system (hereafter, "bucking loops") positioned to shape the generated TVMF. Both the conductive loops and the bucking loops are positioned within a necklace band 140 of a necklace 110. In some configurations, as described herein, the bucking loops can also be loops of the conductive coil. Generally, at least one of the bucking loops of the shaping system carries an electrical signal in the opposite direction of the conductive loop. In some configurations, at least one of the bucking loops carries an electrical signal in the same direction to the conductive loop.

Broadly, configurations of necklaces 110 including a shaping system can be divided into two groups: necklaces 110 including a shaping system with multiple bucking loops, and necklaces 110 including a shaping system with a single bucking loop. Configurations of necklace 110 including multiple bucking loops are described in regards to FIGS. 5A-5I and FIG. 6, and configurations of a necklace 110 including a single bucking loop are described in FIGS. 7A-7F.

Figure 5A:
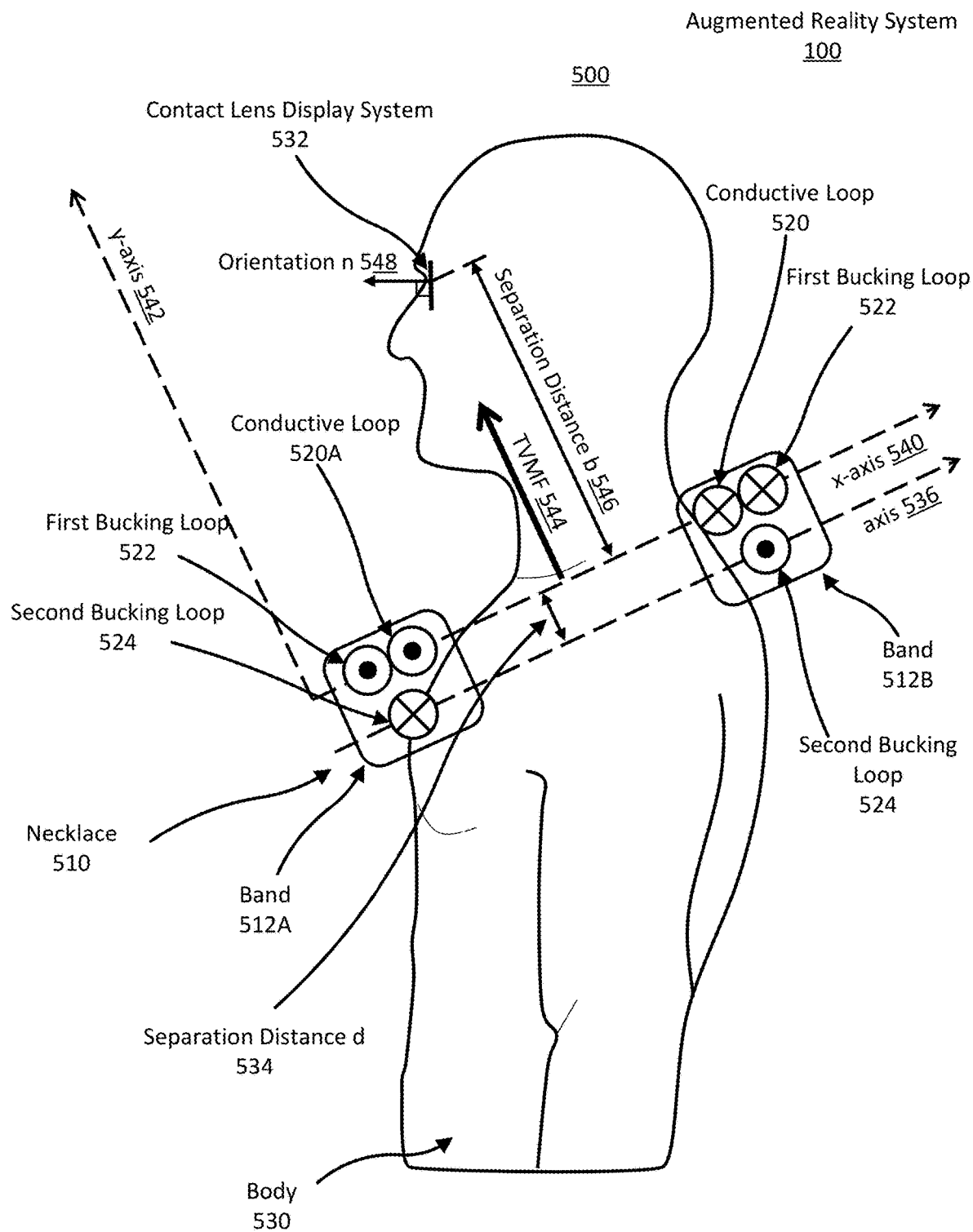
FIG. 5A is a diagram of an augmented reality system including a necklace with a shaping system having two bucking loops.

FIG. 5A is a diagram 500 of an augmented reality system 100 including a necklace 510 with a shaping system with two bucking loops. The necklace 510 is configured to transmit energy to a contact lens display system 532 of the augmented reality system 100. In this example, the diagram 500 also includes a wearer who is wearing the necklace 510 on their body 530 and the contact lens display system 532 on their eyes. The necklace 510 is positioned on the body 530 such that the conductive loop 520 and the bucking loops of the shaping system are wound around the wearer's neck along the band 512.

Necklace 510 of FIG. 5A includes many similarities to necklace 410 of FIG. 4A. That is, as illustrated, the band 512 of the necklace 510 is contacting the body 530 at the chest and upper back, the conductive loop 520 defines an x-axis 540 and a y-axis 542 orthogonal to the x-axis, and the contact lens display system 532 is separated from the x-axis 542 by a separation distance b 546. The necklace 510 generates a time varying electrical signal which is converted into a TVMF 544 parallel to the y-axis 542. The contact lens display system 532 is inductively coupled to the necklace 510 such that energy can transmitted from the necklace 510 to the contact lens display system 532.

In FIG. 5A, the necklace includes a shaping system that includes a first bucking loop 522 and a second bucking loop 524 which are wound around the wearer's neck. The conductive loop 520, the first bucking loop 522, the second bucking loop 524, and the band 512 of necklace 510 are illustrated as two cross-sections on the body 530 because the elements encircle the wearer's neck. In the illustrated example, the first bucking loop 522 is aligned with the conductive loop 520 along the x-axis 540 and is positioned closer to the body about the wearer's neck relative to the conductive loop 520. Alternatively stated, the first bucking loop 522 is on the outer edge of the band 512 while the conductive coil 520 is along the inner edge of the band 512 relative to the wearer's 532 neck. The second bucking loop 524 is nearer the bottom surface of the necklace band 512 relative to the conductive coil 520 and first bucking loop 522. In some examples, the second bucking loop is separated from the bottom surface of the necklace band 512 by at least the width of the second bucking loop, but can be separated from the bottom surface by any suitable distance. The second bucking loop 524 is separated from the conductive loop along the y axis 542 by a separation distance d 534. Additionally, the second bucking loop 524 is aligned along an axis 536 that is parallel to the x-axis 540. The positions of the conductive loop 520, first bucking loop 522, and second bucking loop 524 in FIG. 5A are given as an illustrative example. In various other configurations, the elements of necklace 510 can take any number of other positions and orientations.

In various configurations, the necklace 510 can include one or more signal generators to generate drive currents through the conductive loop 520, the first bucking loop 522, and the second bucking loop 524. In some examples, the necklace 510 can include signal generators connected to both the conductive loop 520 and one or more bucking loops, while, in other examples, the necklace 510 includes a signal generator independently connected to the conductive loop. In another example, the necklace 510 includes a single signal generator connected to both bucking loops to generate a single electrical signal in both bucking loops. In another example, the necklace 510 includes two signal generators, with each signal generator connected to a bucking loop such that each signal generator can independently generate an electrical signal in a single bucking loop. Whatever the configuration, the loops convert the time-varying electrical signals into time-varying magnetic fields as the signal travels through the loops.

The signal generators in the necklace 510 can be configured to generate drive currents in the conductive loops and bucking loops in the same or different directions. In the illustrated example of FIG. 5A, the signal generator(s) are configured to generate a drive current in the conductive loop 520 that is in the same direction as the drive current in the first bucking loop 522. Further, the signal generator(s) are configured to generate a drive current in the second bucking loop 524 that is in the opposite direction as the drive current in the conductive loop 520 and first bucking loop 522. Therefore, at a given instant in time, the drive current in the conductive loop 520 and first bucking loop 522 can travel in a clockwise direction about the wearers neck and the drive current in the second bucking loop 524 can travel in a counter-clockwise direction about the wearers neck.

Additionally, the signal generators in the necklace can be configured to generate drive currents in the conductive loops and bucking loops with differing relative strengths. For example, the drive current in the conductive loop 520 can be greater than the drive current in the first bucking loop and second bucking loop. In another example, the total drive current in the conductive loop and the first bucking loop is greater than the second bucking loop. In another example, the drive current in each loop is substantially equal.

In the illustrated configuration the conductive loop 520 and bucking loops function similarly to a Halbach array with each loop carrying a similar drive current. A Halbach array is a particular arrangement of magnets that increases the magnetic field on one side of the array while decreasing the magnetic field on the opposing side of the array. The magnetic field on one side of the array is increased by constructive interference caused by the particular arrangement of magnets, and the magnetic field on the opposing side is decreased by destructive interference caused by the particular arrangement of magnets. Accordingly, in the context of FIG. 5A, the conductive loop 520 and the bucking loops 522 and 524 increase the magnetic field in the direction of the contact lens display 532 while decreasing the magnetic field in the direction of the body 530.

For example, the conductive loop 520 and the first bucking loop 522 each generate a TVMF that constructively interfere, and the second bucking loop 524 generates a TVMF that destructively interferes with the TVMF of the conductive loop 520 and the first bucking loop 522. Alternatively stated, the necklace produces a resulting TVMF that is the vector sum of all the TVMFs produced by the loops of the necklace. Due to the configuration of the loops, the resulting TVMF produced by the necklace 510 is increased in the direction of the contact lens display 532 and decreased in the direction of the body 530. Therefore the shaping system increases the power to the contact lens display 532 while decreasing energy absorbed by the body 530. The degree of increase and decrease depend on the separation distance d, a separation distance between the first bucking loop 522 and the conductive loop, the relative drive currents in each of the loops, and the distance from the loops to the body.

Figure 5B:
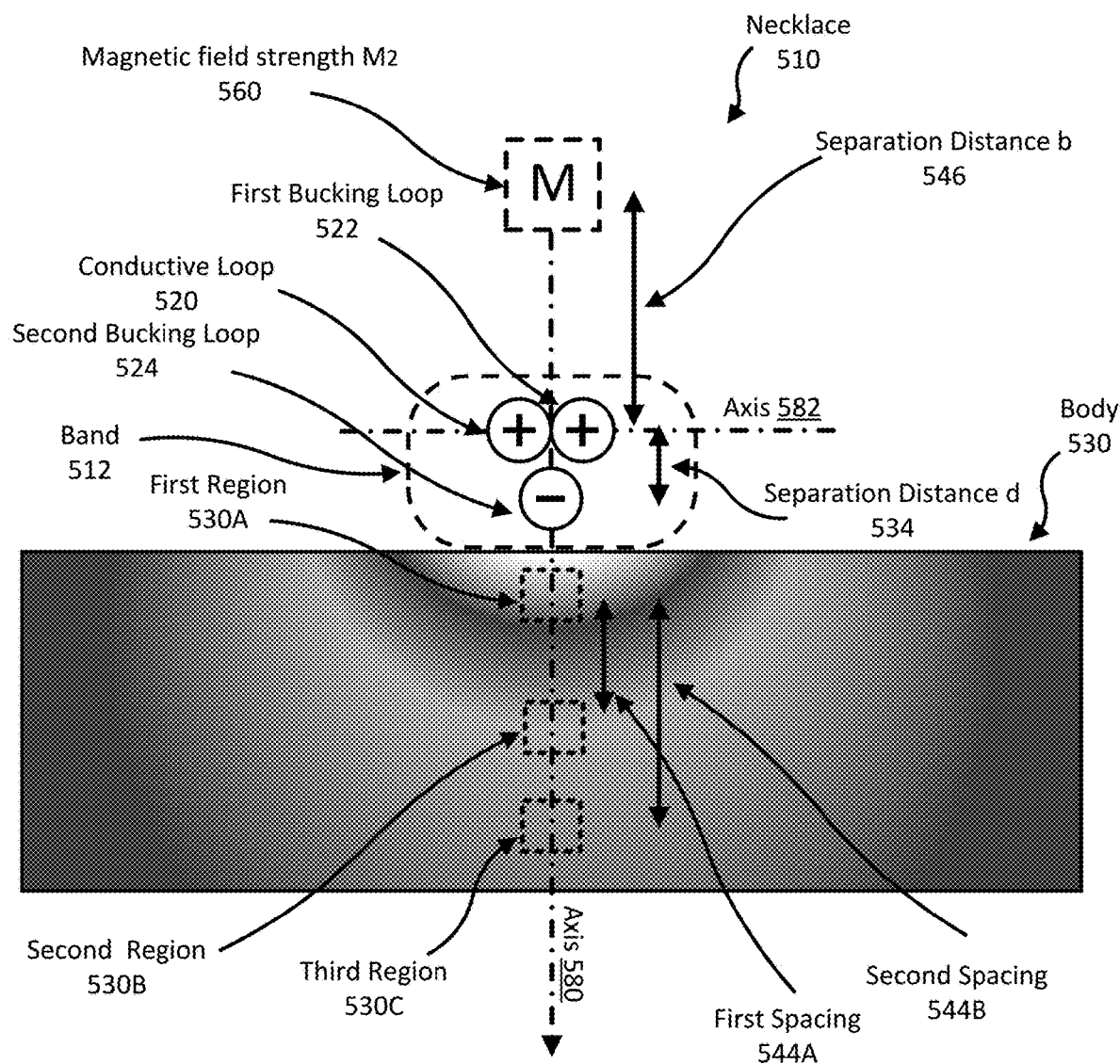
FIG. 5B is a more detailed cross-sectional image of the necklace of FIG. 5A and shows the generated SAR in a wearers body while the necklace operates as part of an AR system.

FIG. 5B is a more detailed cross-sectional image of the necklace 510 and shows the generated SAR in the body while the necklace 510 operates as part of an AR system. The illustration of FIG. 5B is similar to FIG. 4B in many ways. For example, the illustrated areas of the body 530 in FIG. 5B is similar to the body 430 in FIG. 4B such that the characteristics of the tissue in each illustration are approximately equal. Thus, similar shading in FIG. 5B and FIG. 4B represent similar SAR levels. The bounded M 560 represents a point in space at a separation distance b 446 from the conductive loop along axis 580 at which the generated TVMF is measured with strength $M_2$. Additionally, the distance between the second bucking loop 524 and the surface of the body 530 is similar to the distance between conductive loop 420 of and the surface of the body 430 in FIG. 4B.

Necklace 510 includes a shaping system with a first bucking loop 522 and second bucking loop 524 to increase magnetic field strength $M_2$ 560 and decrease energy absorbed by the body 530. The first bucking loop 522 and conductive loop 520 lie on an axis 582 that is parallel to the body 530 (similar to the x-axis 540). Additionally, the first bucking loop 522 and conductive loop 520 are separated from the second bucking loop 524 by a separation distance d 534 along an axis 580 orthogonal to the plane of the body 530 (parallel to y-axis 542). Here, the conductive loop 520 and the first bucking loop 522 include drive currents moving in the same direction (out of the page, indicated by a "•") such that their generated TVMFs constructively interfere. The second bucking loop 524 includes a drive current moving in an opposite direction to the conductive loop 520 and the first bucking loop 522 (in to the plane of the page of FIG. 5B, indicated by an "x"). The second bucking loop 524 generates a TVMF that destructively interferes with the TVMF generated by first bucking loop 522 and conductive loop 520. In the illustrated configuration, the loops of necklace 510 increase the resulting TVMF in the direction of the contact lens display (i.e., towards the bounded M) and decreases the TVMF in the direction of the body 530. Accordingly, the SAR in the body 530 is decreased and the power transfer to the contact lens display is increased due to the configuration of the loops in necklace 510.

For context, referring to necklace 410 of FIG. 4B, the SAR in the first region 530A of FIG. 5B is less than the SAR in the similar first region 430A of FIG. 4B. Similarly, the SAR in the second region 530B of the FIG. 5B is less than the second similar region 430B of FIG. 4B and the SAR in the third region 530C of FIG. 5B is less than the similar third region 430C of FIG. 4B. In the example of FIG. 5B, the SAR in the body 530 no longer decreases radially along the axis 580. Here, the SAR decreases as a function of the separation distance d 534, a coil spacing between the conductive coil 520 and first bucking loop 522, and the relative currents between loops.

Figure 5C:
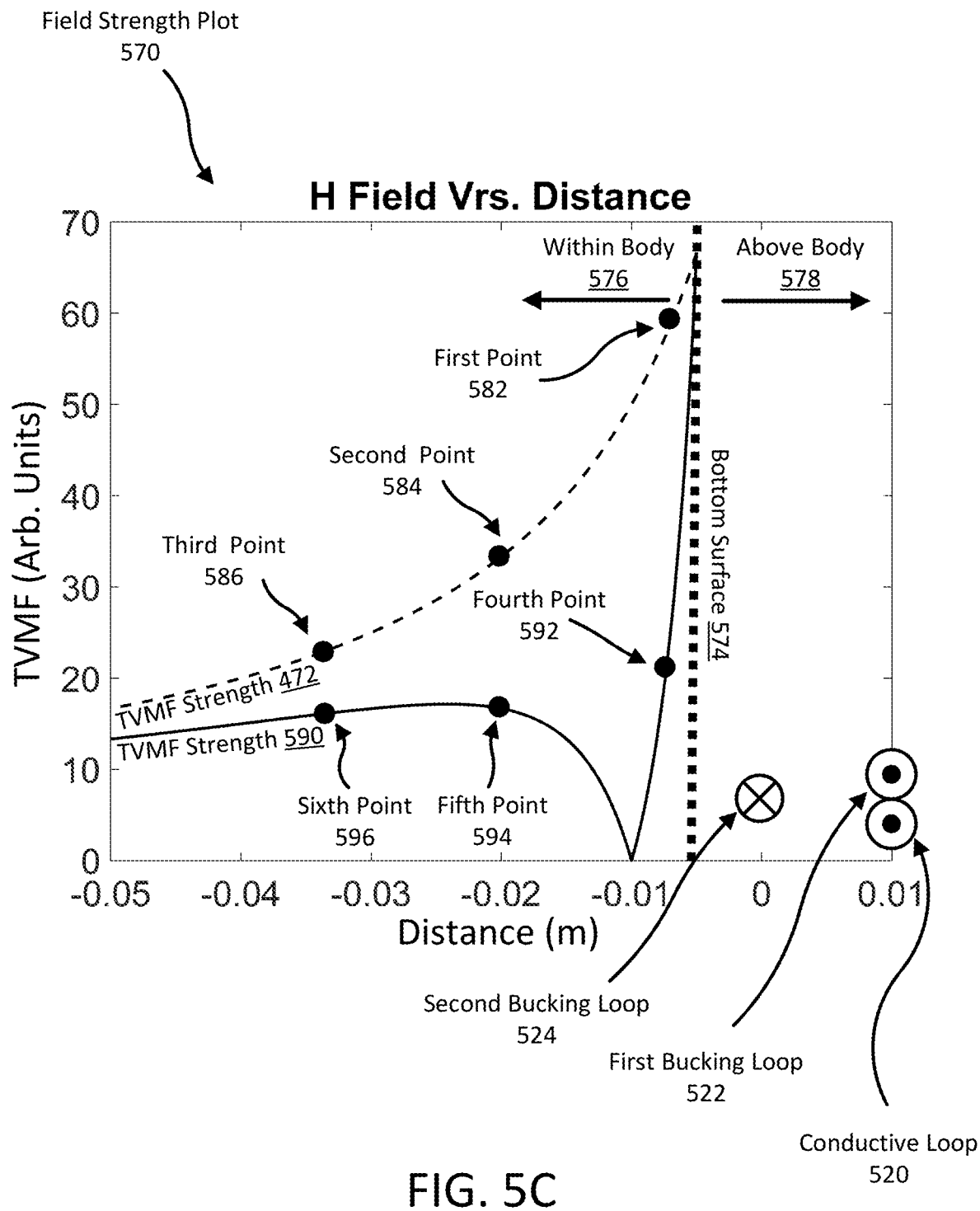
FIG. 5C is a field strength plot giving the strength of the generated TVMF of the necklace in FIG. 5B in a wearers body as a function of distance from the second bucking loop.

FIG. 5C is a field strength plot 570 giving the strength of the generated TVMF (solid line 590) of the necklace 510 in the wearers body 530 as a function of distance from the second bucking loop 524. The strength of the generated TVMF of the necklace 410 is shown for comparison (dashed line 472). In this example, the conductive coil 520 and first bucking loop 522 of the necklace 510 are each indicated by the circle with a "•" at a distance of 0.01 m. The second bucking loop of the necklace is indicated by a circle with an "x" at a distance of 0.00 m. The "•" indicates that the drive current in the first bucking loop 522 and conductive loop 520 are in the same direction, and the "x" indicates that the drive current in the second bucking loop 524 is in the opposite direction than the first bucking loop 522 and conductive loop 520. The bottom surface of the band 512 in contact with the body 530 is indicated by the dashed line 574. Therefore, areas of plot 570 to the left 576 of bottom surface 574 are within the body 530 and areas of the plot 570 to the right 578 of the bottom surface 574 are above the body 530. In this example, the bottom surface 574 is approximately 0.015 m beneath the first bucking loop 522 and 0.005 m below the second bucking loop 524, but can be any other distance. The separation distance d is 0.010 m, but can be any other distance.

Plot 570 indicates that the TVMF strength 590 of necklace 510 decreases with increasing separation from the conductive coil 520 to a greater degree than the strength 572 of a necklace without a shaping system (e.g., necklace 410). Additionally, the TVMF strength 590 is not inversely proportional to distance within the body 576. Here, the measured TVMF strength 590 within the body 576 is based on the separation distance d, the separation between the conductive coil 520 and first bucking loop 522, the distance from the second bucking loop 524 to the surface of the body (e.g., band 574), and the distance within the body 576. In some examples, the TVMF strength 590 can be approximated using a static model. In this case, the TVMF strength 590 can be approximated by the following relationship:

$$B_t \sim \frac{\mu_0 i}{2} r \left\{ \frac{2}{(r^2 + b^2)^{3/2}} - \frac{1}{(r^2 + (b+d)^2)^{3/2}} \right\} \quad (1)$$

where $B_t$ is the TVMF strength 590, r is the radius of the loop, d is the separation distance d 534, i is the current in a single coil, b is the separation distance b 546 along the axis 580, and $\mu_0$ is the permeability of free space.

Figure 5D:
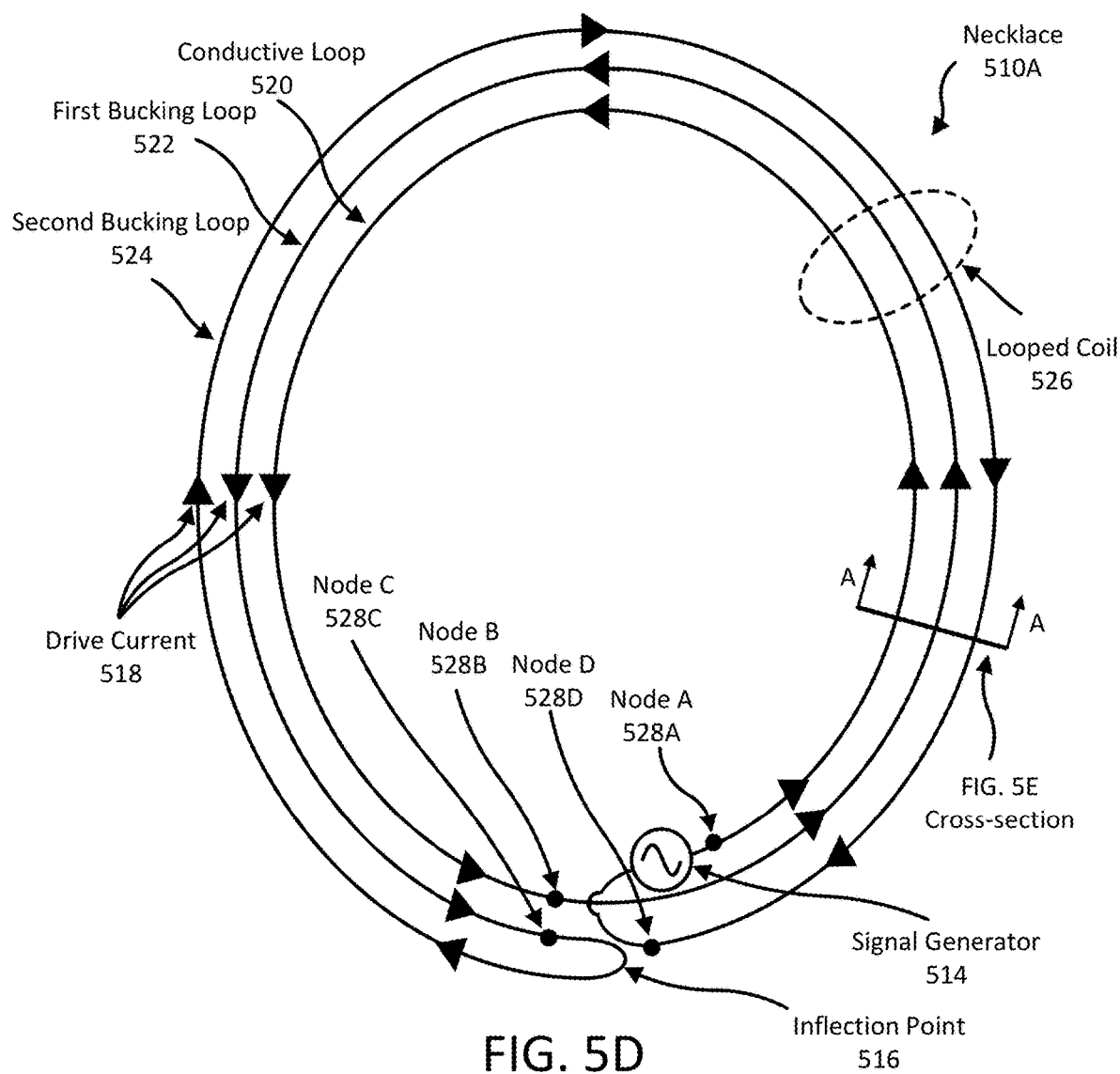
FIG. 5D is a diagram illustrating an example layout for components of a necklace including a shaping system with two bucking loops.

FIG. 5D is a diagram illustrating an example layout for components of a necklace 510A including a shaping system. In the illustrated example, looped coil 526 is wound in the same direction for two turns such that the conductive loop 520 and the first bucking loop 522 are wound in the same direction. After two turns, the looped coil 526 is turned about an inflection point 516 and wound in the opposite direction for a single turn such that the second bucking loop 524 is wound in the opposite direction of the conductive loop 520 and first bucking loop 522. While the necklace 510A of FIG. 5D is illustrated on a plane, the looped coil 526 can be wound in a way such that the cross-section of the necklace 510A is similar to the cross-section in FIG. 5E. The cross-section of FIG. 5E is similar to the cross-sections described for necklace 510 in FIGS. 5A and 5B.

Similar to FIG. 4D, each loop in the necklace 510 has an inherent inductance $L_{EQ}$ based on the size, shape, number of turns, and material of the coil that influence the electrical signals travelling through the coil. Because each loop is part of the looped coil, many of the characteristics between the loops are the same. Additionally, in various other embodiments, the necklace 510A can include additional or fewer hardware elements 130. For example, the necklace can include additional capacitors, inductors, control circuits, etc. Further, the signal generator 514A can generate drive currents that can be a time-varying electrical signal. Therefore, the generated TVMF of the looped coil 526 can be either into, or out of, the plane of the page depending on the direction the electrical signal is travelling through the looped coil 526.

In this example, the signal generator 514A generates a single drive current (indicated by arrows 518) that travels through the entire looped coil 526. Therefore, the signal generator 514A drives a single current through the conductive loop 520, the first bucking loop 522, and the second bucking loop 524. The drive current 518 travels in a counter-clockwise direction through the first bucking loop 522 and conductive loop 520 because they are wound in the same direction. The conductive loop 520 and first bucking loop 522 convert the drive current into constructively interfering TVMFs out of the plane of the page as the drive current 518 travels through the loops. The drive current 518 changes direction at the inflection point 516 and travels in a clockwise direction through the second bucking loop 524. The second bucking loop 524 converts the drive current 518 into a TVMF that destructively interferes with constructively interfering TVMF of the first bucking loop 522 and conductive loop 520.

Figure 5E:
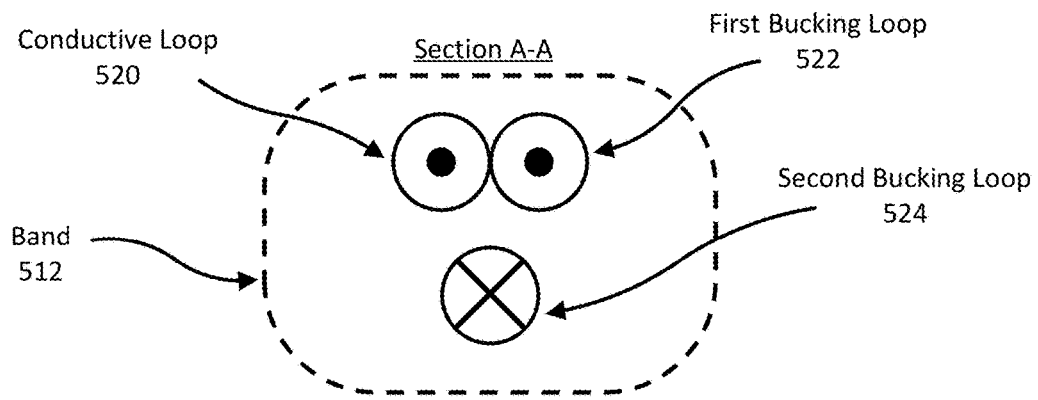
FIG. 5E is a cross-section of the necklace of FIG. 5D.

FIG. 5E is a cross-section of necklace 510A and shows the orientation of the various loops of the looped coil 526. The portion of the band 512 closest to the bottom of the page of FIG. 5E is the portion of the band 512 closest to the body 530 of a wearer of the necklace. The conductive loop 520 and the first bucking loop 522 are coplanar and equidistant from the body 530 while the second bucking loop 524 lies closer to the surface of the band 512 in contact with the body (towards the bottom of the page). In other examples, the first bucking loop 552 may also be positioned above conductive loop 520. In this example cross-section, the amount of current in the conductive loop 520 and the bucking loop 522 travelling through the cross section in a first direction (i.e., out of the plane of the page in FIG. 5E) is greater than the amount of current in the second bucking loop 524 travelling through the cross-section in the opposite direction (i.e., into the plane of the page of FIG. 5E). Due to the orientation of the loops and drive current 518 directions, the resulting TVMF of necklace 510A is increased in a direction towards the contact lens display 532 and decreased in a direction towards the body 530.

Figure 5F:
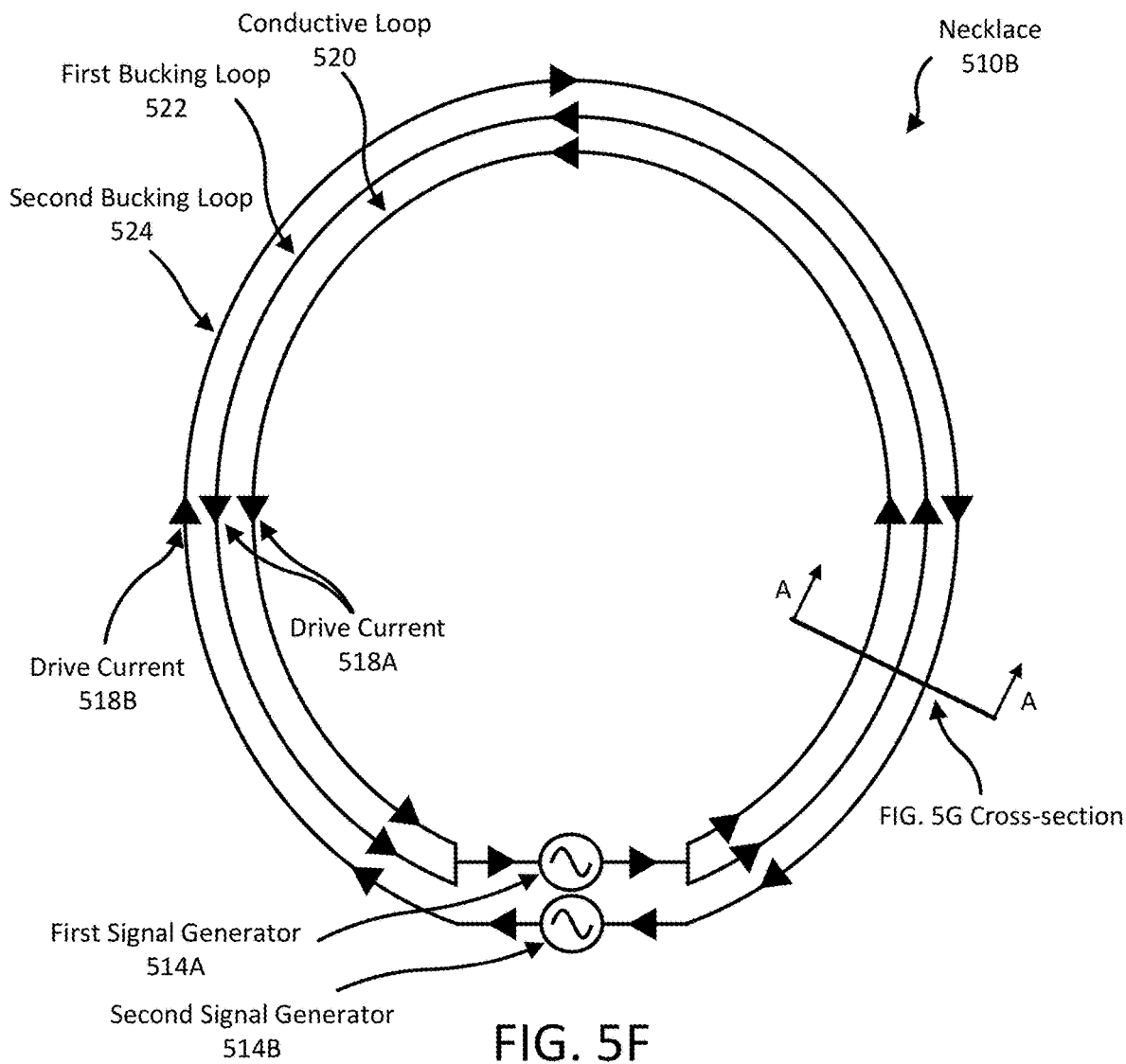
FIG. 5F is a diagram illustrating another example layout for components of a necklace including a shaping system with two bucking loops.
Figure 5G:
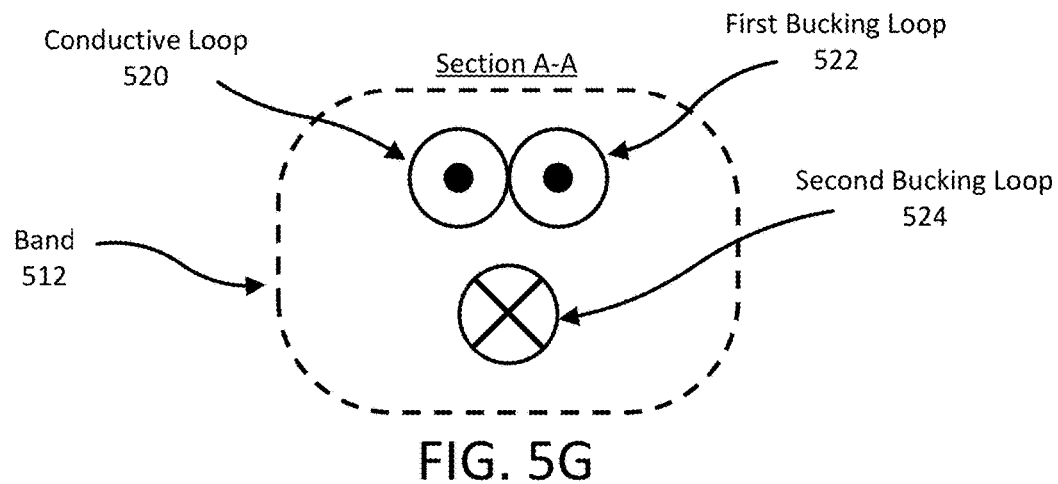
FIG. 5G is a cross-section of the necklace of FIG. 5D.

In various other embodiments, rather than a single looped coil that winds in various directions, the necklace 510 can include multiple signal generators to independently generate electrical signals in separate coils of the necklace. For example, FIG. 5F is a diagram for an example necklace 510B including a shaping system with multiple signal generators. In this example, the necklace 510B includes a first signal generator 514A, a second signal generator 514B, a conductive loop 520, a first bucking loop 522, and a second bucking loop 524. The first signal generator 514A is connected in series to the first bucking loop 522 and the conductive loop 520 which are connected in parallel. The second signal generator 514B is connected in series to the second bucking loop 524.

The necklace 510B of FIG. 5F shares many of the similarities to FIG. 4D that necklace 510A of FIG. 5C does. However, the shaping system of FIG. 5F allows for independent control of the drive currents moving in opposite directions in the loops of the necklace 510B. Here, the first signal generator 514A generates a drive current (indicated by arrows 518A) that travels through the conductive loop 520 and first bucking loop 522. The drive current is split between the conductive loop and the first conductive coil based their inherent inductances. In this example, the drive current 518A travels in a counter-clockwise direction and is equally split between the conductive loop 520 and first bucking loop 522, but can be split in any other ratio or travel in the opposite direction. The second signal generator 514B generates a second drive current (indicated by arrows 518B) that travels through the second bucking loop 524 in a clockwise direction. In other configurations, the conductive loop and first bucking loop can be wound in a manner similar to necklace 510A of FIG. 5C. That is, the conductive loop 520 and the first bucking loop 522 can be two loops of a looped coil connected to the first signal generator 514A.

The illustrated necklace 510B functions similarly to necklace 510A of FIG. 5D. That is, the generated TVMF from the first bucking loop 522 and conductive loop 520 constructively interfere, and the generated TVMF from the second bucking loop 524 destructively interferes with TVMF of the conductive loop 520 and first bucking loop 522. Referring to the cross-section of necklace 510B in FIG. 5G, the resulting TVMF generated from the necklace 510B is increased in a direction towards the contact lens display and decreased in a direction towards the body. Additionally, in this example cross section, the amount of current in the conductive loop 520 and the bucking loop 522 travelling through the cross-section in a first direction is greater than the amount of current in the second bucking loop 524 travelling through the cross-section in the opposite direction.

Figure 5H:
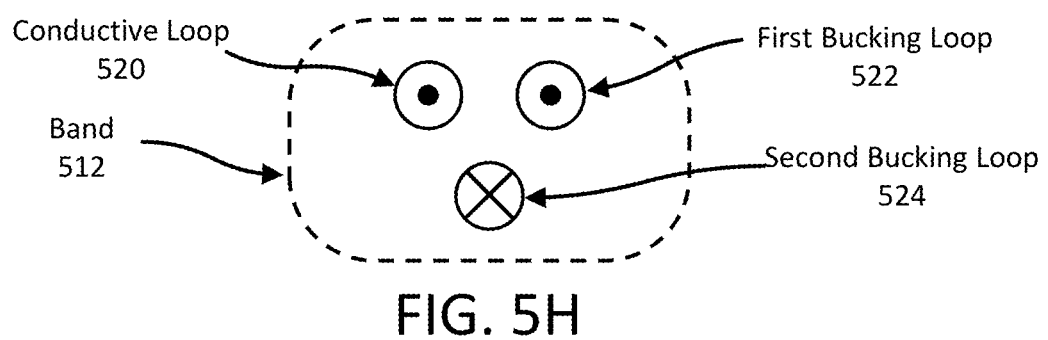
FIG. 5H-5I are cross-sections of various necklaces including a shaping system with two bucking loops.
Figure 5I:
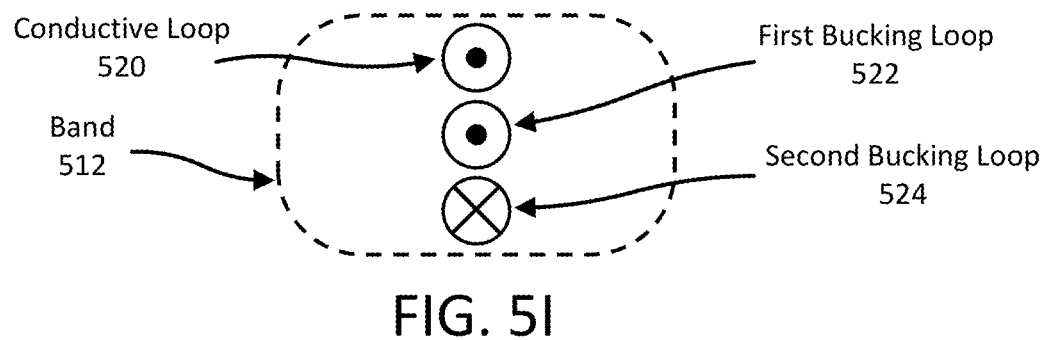

In various other configurations of a necklace 110 for an AR system 110 including a shaping system, the coils can be arranged in any number of manners within the necklace band. As means of example, FIGS. 5H-5I illustrate cross-sections for a necklace including a shaping system with varying configurations of the conductive coil 520, first bucking loop 522, and second bucking loop 524 within the band 512. The portion of the band 512 closest to the bottom of the page of each respective figure is the portion of the band 512 closest to the body 530 of a wearer of the necklace. The necklaces can include any number of signal generators connected to the loops and the loops can be wound in a variety of ways. Notably the loops in FIG. 5I are concentric about the wearers neck. The necklace increases the resulting TVMF produced in one direction, while decreasing the resulting TVMF in another direction. The degree and direction of increase and decrease depends on the orientation of the coils and the relative drive currents between the coils.

Figure 6:
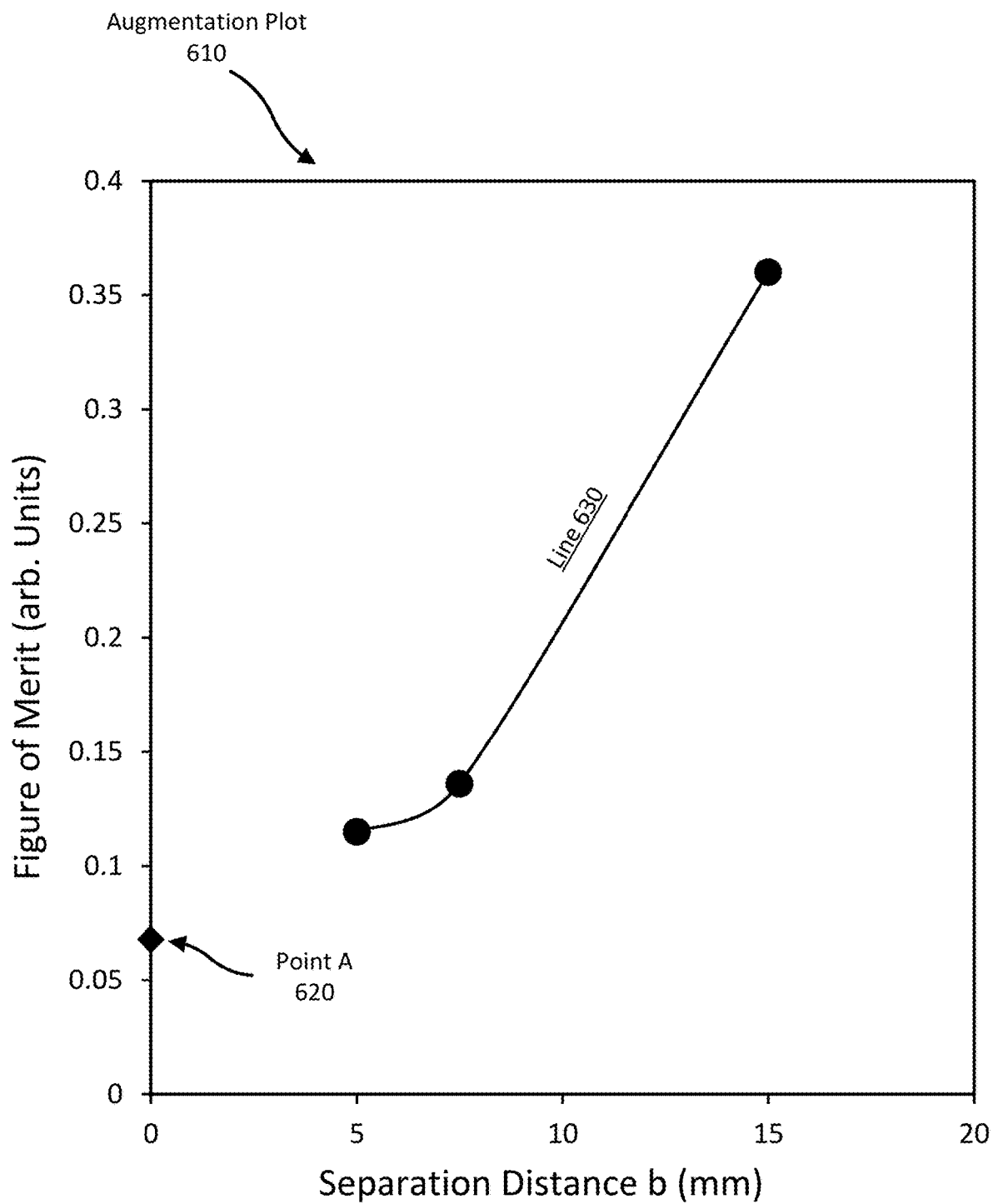
FIG. 6 is an augmentation plot showing the figure of merit as a function of separation distance for various configurations of necklaces.

FIG. 6 is an augmentation plot 610 illustrating the effectiveness of a necklace 110 with and without a shaping system in the context of an AR system 100. In plot 610, the x-axis is the separation distance b and the y-axis is the figure of merit. Here, the figure of merit is defined as the square of the strength of the TVMF generated by a necklace at a separation distance to the eye (i.e., $H^2$ at separation distance b) divided by the SAR generated in a given region of the body by the necklace 110. Therefore, the figure of merit increases when the strength of the TVMF increases at a separation distance and/or the energy absorbed by the body decreases in a given region.

Plot 610, shows the figure of merit for a necklace including a single coil as in necklace 410 (shown as point A 620) and the figure of merit for a necklace including a shaping system as in necklace 510 (shown as line 630). In this example, the drive currents, coil properties, materials, etc. for necklace 410 and necklace 510 are all similar such that plot 610 is a valid comparison for each necklace's figure of merit. Plot 610 illustrates that the figure of merit of necklace 410 is independent of separation distanced because necklace 410 includes a single conductive loop and there is no separation distance d. Plot 610 illustrates that figure of merit for the necklace 510 increases as the separation distance d increases. For all values of the separation distance d, the figure of merit of the necklace 510 is greater than the figure of merit of the necklace 410. Therefore, in general, necklace 510 increases the magnetic field in the direction of the contact lens display and decreases the magnetic field in the direction of the body to a greater degree than necklace 410.

Figure 7A:
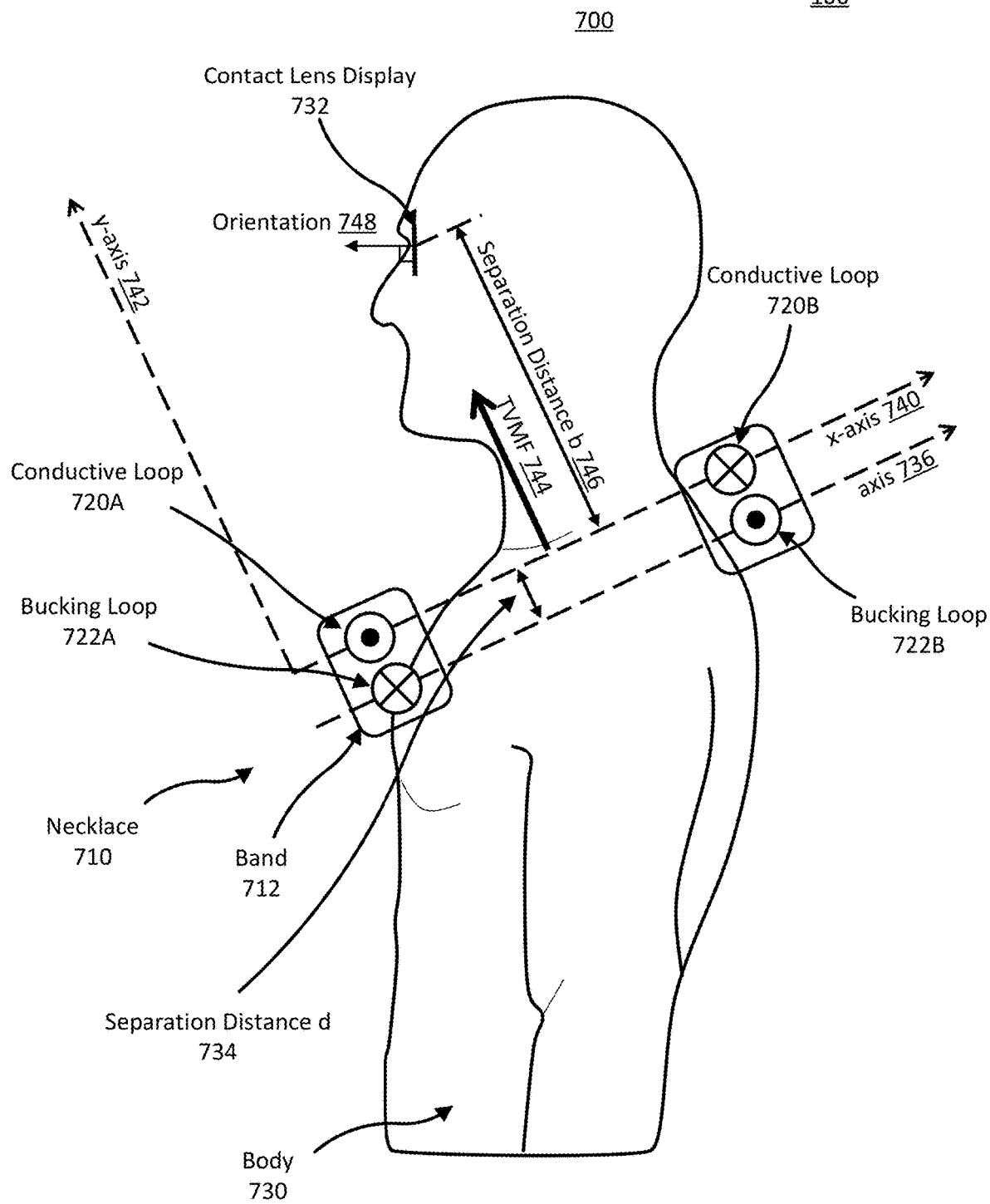
FIG. 7A is a diagram of an augmented reality system including a necklace with a shaping system having one bucking loop.

FIG. 7A is a diagram 700 of an augmented reality system 100 including a shaping system with one bucking loop. The diagram 700 includes a cross-section of a necklace 710 with a conductive loop 720 and a shaping system with a bucking loop 722 within a necklace band 712. Here, the current in the conductive loop 720 and the bucking loop 722 are two different magnitudes. The necklace 710 is configured to transmit energy to a contact lens display system 732 of the augmented reality system 100. In this example, the diagram 700 also includes a body 730 of a wearer who is operating the augmented reality system 100. The wearer of the augmented reality system 100 is wearing the necklace 710 on their body 730 and the contact lens display system 732 on their eyes. The necklace 710 is positioned on the body 730 such that the conductive loop 720 and the bucking loop 722 of the shaping system are worn around the wearer's neck along the band 712.

Necklace 710 of FIG. 7A includes many similarities to necklace 510 of FIG. 5A. That is, as illustrated, the band 712 of the necklace 710 is positioned similarly on the body 730, the conductive loop 720 defines an x-axis 740 and a y-axis 742, and the contact lens display system 732 is at a separation distance b 746. The necklace 710 generates a time varying electrical signal which is converted into a TVMF 744 parallel to the y-axis 742. The contact lens display system 732 is inductively coupled to the necklace 710 such that energy can transmitted from the necklace 710 to the contact lens display system 732.

In FIG. 7A, the necklace includes a shaping system with a single bucking loop 722 which is worn around the wearer's neck. The bucking loop 722 is nearer the body of the necklace band 712 relative to the conductive loop 720. The bucking loop 722 is separated from the conductive loop along the y axis 742 by a separation distance d 734. Additionally, the bucking loop 722 is aligned along an axis 736 that is parallel to the x-axis 740 and nearer the body 730 relative to the conductive loop 722. In various other configurations, the elements of necklace 710 can take any number of other positions and orientations.

In various configurations, the necklace 710 can include one or more signal generators to generate drive currents to pass through the conductive loop 720 and the bucking loop 722. The signal generator(s) in the necklace 710 can be configured to generate drive currents in the conductive loop 720 and bucking loop 722 in opposite directions. Therefore, the drive current in the conductive loop 720 travels in a clockwise direction about the wearers neck and the drive current in the bucking loop 722 travels in a counter-clockwise direction about the wearers neck. Additionally, the signal generator(s) in the necklace 710 can be configured to generate drive currents in the conductive loop 720 that is greater than (or less than) the drive current in the bucking loop 722.

The conductive loop 720 generates a TVMF and the bucking loop 722 generates a TVMF that destructively interferes with the TVMF of the conductive loop 720. In another example, out of phase electrical signals in the loops may generate a destructively interfering TVMF. Due to the configuration of the loops, the resulting TVMF produced by the necklace 710 is increased in the direction of the contact lens display 732 and decreased in the direction of the body 730. Therefore the shaping system increases the power to the contact lens display 732 while decreasing energy absorbed by the body 730. The degree of increase and decrease can be based on the separation distance d and the relative drive currents in each of the loops.

Figure 7B:
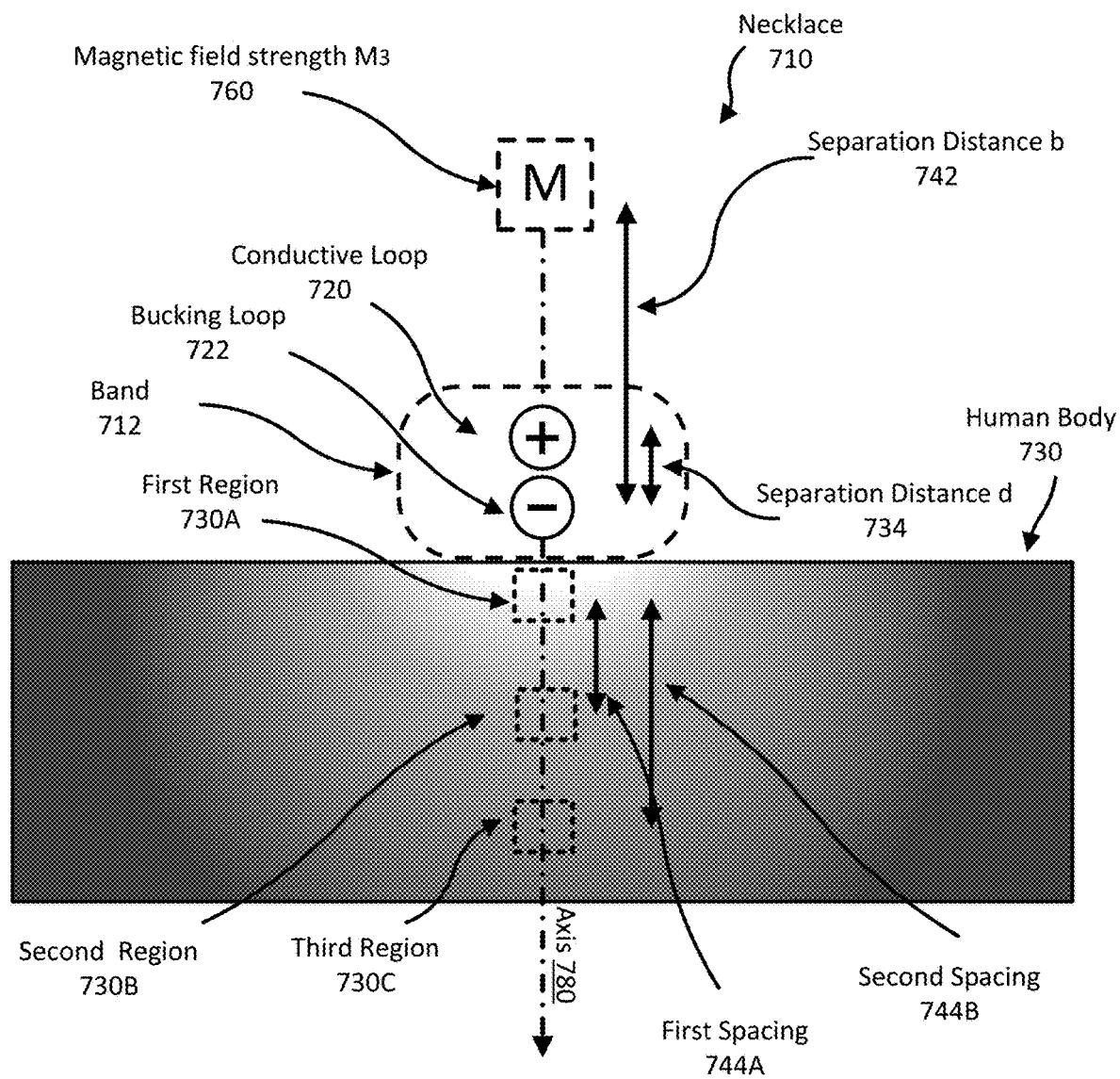
FIG. 7B is a more detailed cross-sectional image of the necklace of FIG. 7A and shows the generated SAR in a wearers body while the necklace operates as part of an AR system.

FIG. 7B is a more detailed cross-sectional image of the necklace 710 and shows the generated SAR in the body 730 while the necklace 710 operates as part of an AR system 100.

The illustration of FIG. 7B is similar to FIG. 5B in many ways. For example, the illustrated areas of the body 730 in FIG. 7B is similar to the body 530B in FIG. 5B such that the characteristics of the tissue in each illustration are approximately equal. Thus, similar shading in FIG. 7B and FIG. 7B represent similar SAR levels. The bounded M 760 represents a point in space at a separation distance b 746 from the conductive loop 720 along axis 780 at which the generated TVMF has strength $M_2$. Additionally, the distance between the bucking loop 722 and the surface of the body 730 is similar to the distance between second bucking loop 524 of and the surface of the body 530 in FIG. 5B.

Necklace 710 includes a shaping system with a single bucking loop 722 to increase magnetic field strength $M_3$ 760 and decrease energy absorbed by the body 730. The conductive loop 720 is separated from the bucking loop 724 by a separation distance d 734 along an axis 780 orthogonal to the plane of the body 730 (parallel to y-axis 742). Here, the conductive loop 720 and the bucking loop 722 include drive currents moving in opposite directions such that their generated TVMFs destructively interfere. In the illustrated configuration, the loops of necklace 710 increase the resulting TVMF in the direction of the contact lens display (i.e., towards the top of the page in FIG. 7B) and decreases the TVMF in the direction of the body 730 (i.e., towards the bottom of the page in FIG. 7B). Accordingly, the SAR in the body 730 is decreased and the power transfer to the contact lens display is increased due to the configuration of the loops in necklace 710.

The SAR generated in the body decreases radially into the body similar to necklace 410 of FIG. 4A. However, because of the bucking loop 722, the generated SAR from necklace 710 is lower than that of necklace 410. For context, referring to FIG. 4B, the SAR in the first region 730A of FIG. 7B is less than the SAR in the similar first region 430A of FIG. 4B. Similarly, the SAR in the second region 730B of the FIG. 7B is less than the second similar region 430B of FIG. 4B and the SAR in the third region 730C of FIG. 7B is less than the similar third region 430C of FIG. 4B. The degree of difference between regions is a function of the separation distance d 734 and the relative currents between loops.

Figure 7C:
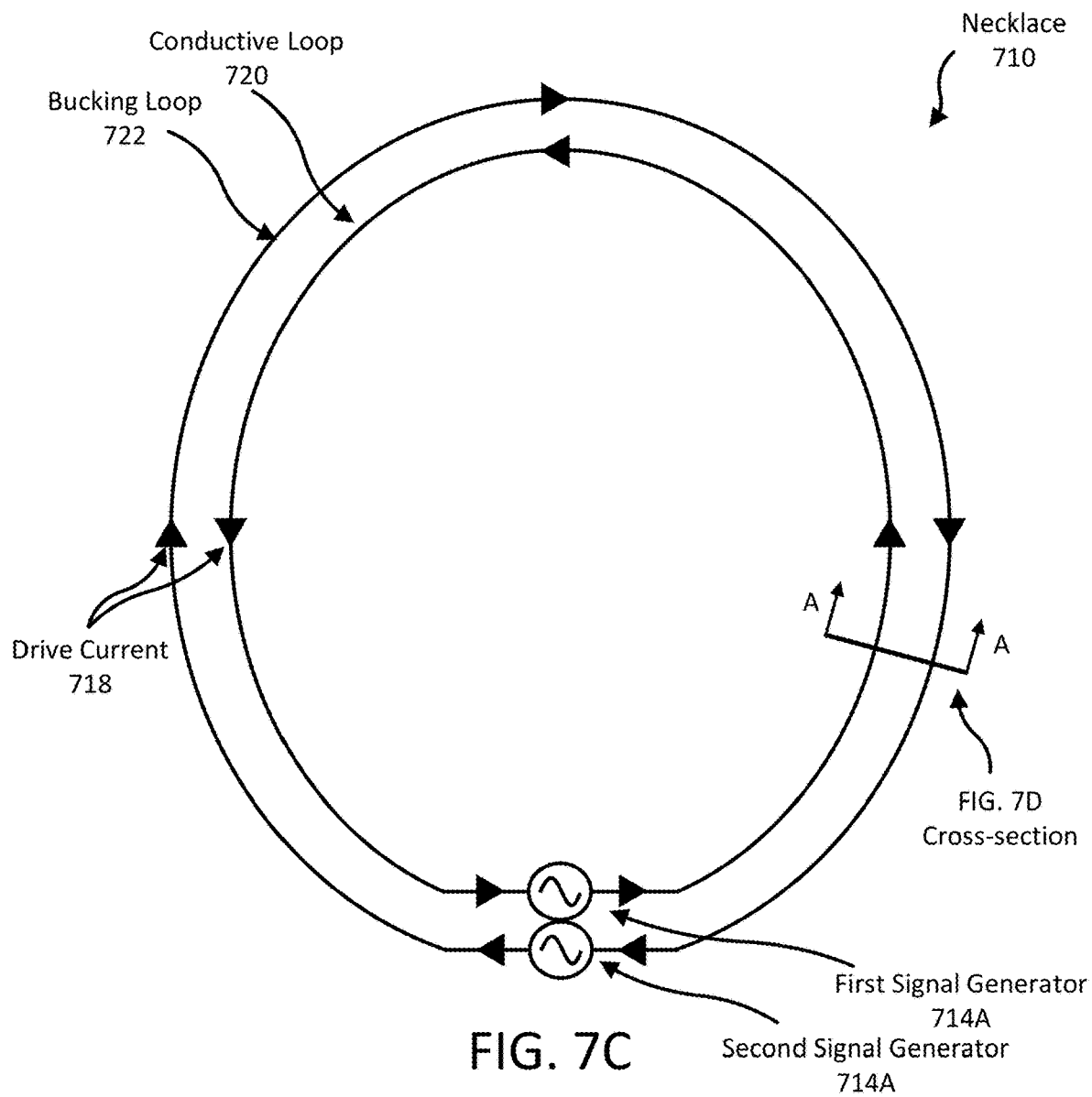
FIG. 7C is a diagram illustrating an example layout for components of a necklace including a shaping system with one bucking loops.

FIG. 7C is a diagram for an example necklace 710A including a shaping system with a single bucking loop 722 and multiple signal generators 714. In this example, the necklace 710B includes a first signal generator 714A, a second signal generator 714B, a conductive loop 720 and a bucking loop 722. The first signal generator 714A is connected to the conductive loop 720 and the second signal generator 714B is connected to the bucking loop 724.

The shaping system of FIG. 7C allows for independent control of the drive currents moving in opposite directions in the loops of the necklace 710B. Here, the first signal generator 714A generates a drive current (indicated by arrows 718A) that travels in a counter-clockwise direction through the conductive loop 720 and the second signal generator 714B generates a second drive current (indicated by arrows 718B) that travels clockwise through the bucking loop 722. The conductive loop 720 and bucking loop 722 convert the drive current into TVMFs.

Figure 7D:
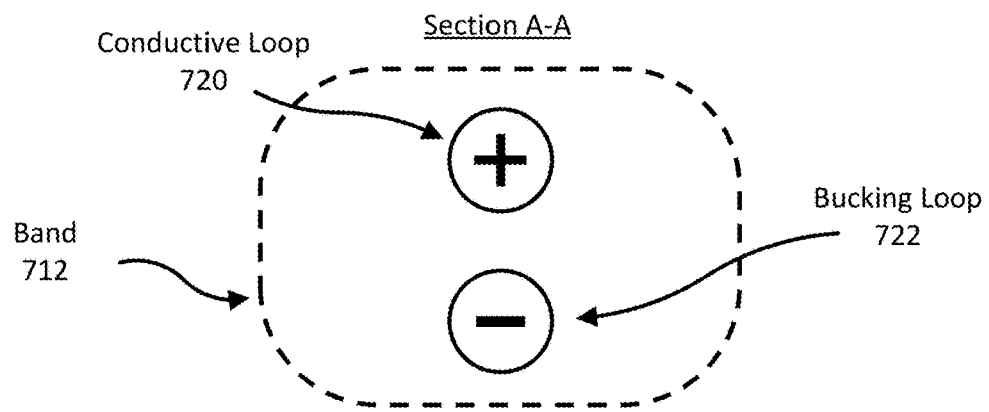
FIG. 7D is a cross-section of the necklace of FIG. 7C.

FIG. 7D is a cross-section of necklace 710A and shows the orientation of the various loops of the looped coil 726. In this example, the generated TVMF from the first bucking loop 722 and conductive loop 720 destructively interfere. Due to the orientation of the loops and drive current 718 directions, the resulting TVMF of necklace 710A is increased in a direction towards the contact lens display 732 and decreased in a direction towards the body 730. In various other configurations of a necklace for an AR system including a shaping system, the loops can be arranged in any number of manners within the necklace band. While not illustrated, necklaces with configurations similar to FIGS. 5H-5I but with a single bucking loop are possible.

Additionally, shaping systems can include any number of loops configured with any number of current directions for the various loops. For example, a shaping system can include six bucking loops with four loops having current in the same direction as the conductive loop and two loops having a drive current in the opposite direction as the conductive loop. Further, the shaping system can include any number of signal generators (1, 2, 3, . . . n signal generators) and winding patterns with any number of inflection points. In various configurations, the shaping system can include any combination of signal generators and winding patterns. Further, the currents in each loop of a shaping system can be in any ratio such that the shaping system can increase or decrease the generated TVMF in any way. Generally, whatever the configuration, the total current in the necklace moving in the direction of the conductive loop is greater than the total current in the direction opposite the conductive loop.

Although the detailed description contains many specifics, these should not be construed as limiting the scope of the invention but merely as illustrating different examples. It should be appreciated that the scope of the disclosure includes other embodiments not discussed in detail above. Various other modifications, changes, and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

Although the detailed description contains many specifics, these should not be construed as limiting the scope of the invention but merely as illustrating different examples. It should be appreciated that the scope of the disclosure includes other embodiments not discussed in detail above. For example, the technologies described are applicable to eye-mounted displays other than the specific types described above. Examples include displays in contact lenses other than scleral contact lenses, and also intraocular displays. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

What is claimed is:

1. A system for providing power to an electronic contact lens via inductive coupling, the system comprising:
   a necklace configured to be worn against a body of a necklace wearer;
   one or more first conductive loops extending along a band of the necklace;
   one or more second conductive loops also extending along the band of the necklace, wherein the one or more first conductive loops are positioned closer to the electronic contact lens along a y-axis than the one or more second conductive loops when the necklace is worn against the body of the necklace wearer, and the y-axis is orthogonal to a plane defined by the one or more first conductive loops; and one or more driver circuits to drive a first total current through the one or more first conductive loops in a first direction to generate a first magnetic field and to drive a second total current through the one or more second conductive loops in an opposite second direction to generate a second magnetic field, wherein:
  the first total current travelling through the one or more first conductive loops in the first direction has a different strength than the second total current travelling through the one or more second conductive loops in the second direction,
  the first magnetic field and the second magnetic field sum to produce a resulting magnetic field, and
  the one or more first conductive loops are separated from the one or more second conductive loops by a distance along the y-axis such that interference between the first and second magnetic fields (a) increases a strength of the resulting magnetic field on a side of the necklace closer to the electronic contact lens, and (b) decreases a strength of the resulting magnetic field on a side of the necklace away from the electronic contact lens; whereby (x) more power is inductively coupled to the electronic contact lens, and (y) less power is absorbed by a region of the wearer's body against which the necklace is worn.

2. The system of claim 1, wherein the one or more first conductive loops are connected in series with the one or more second conductive loops, the first conductive loops and the second conductive loops wound in opposite directions from each other.

3. The system of claim 1, wherein the one or more first conductive loops include a first number of conductive loops and the one or more second conductive loops include a second number of conductive loops less than the first number.

4. The system of claim 1, wherein the first total current that flows through the one or more first conductive loops is greater than the second total current that flows through the one or more second conductive loops.

5. The system of claim 1, wherein:
  the necklace comprises a first surface configured to be placed against the body of the necklace wearer and a second surface opposite to the first surface, and
  the one or more first conductive loops and the one or more second conductive loops are positioned between the first surface and the second surface of the necklace.

6. The system of claim 1, wherein the one or more first conductive loops comprise:
  an upper conductive loop; and
  a lower conductive loop positioned both farther away along the y-axis from the electronic contact lens than the upper conductive loop, and between the upper conductive loop and the one or more second conductive loops.

7. The system of claim 1, wherein the one or more first conductive loops comprise:
  a first loop; and
  a second loop, the first loop and second loop positioned approximately equidistant along the y-axis from the region of the wearer's body against which the necklace is worn.

8. The system of claim 1, wherein the one or more second conductive loops and the region of the wearer's body against which the necklace is worn are separated along the y-axis by a threshold distance.

9. The system of claim 1, wherein the one or more second conductive loops are spaced apart along the y-axis from the region of the wearer's body against which the necklace is worn by at least a width of the one or more second conductive loops.

10. The system of claim 1, wherein the one or more first conductive loops comprise an upper conductive loop, and the one or more second conductive loops comprise a lower conductive loop, the lower conductive loop positioned along the y-axis between the upper conductive loop and the region of the wearer's body against which the necklace is worn.

11. The system of claim 1, wherein the one or more driver circuits further comprises:
  a first driver circuit to drive the first total current through the one or more first conductive loops; and
  a second driver circuit to drive the second total current through the one or more second conductive loops.

12. The system of claim 1, wherein the one or more first conductive loops and the one or more second conductive loops are concentric.

13. The system of claim 1, wherein the electronic contact lens further comprises:
  a contact lens display for displaying images to the necklace wearer, the contact lens display receiving power from the inductively coupled necklace.

14. A system for providing power to an electronic contact lens via inductive coupling, the system comprising:
  a necklace configured to be worn against a body of a necklace wearer;
  a first conductive loop extending along a band of the necklace;
  a second conductive loop also extending along the band of the necklace, wherein the first conductive loop is positioned closer to the electronic contact lens along a y-axis than the second conductive loop when the necklace is worn against the body of the necklace wearer, and the y-axis is orthogonal to a plane defined by the first conductive loop; and
  one or more drivers circuits to drive a first current through the first conductive loop in a first direction to generate a first magnetic field and to drive a second current through the second conductive loop in an opposite direction to generate a second magnetic field, wherein:
    the first magnetic field and the second magnetic field sum to produce a resulting magnetic field, and
    the first conductive loop is separated from the second conductive loop by a distance along the y-axis such that interference between the first and second magnetic fields (a) increases a strength of the resulting magnetic field on a side of the necklace closer to the electronic contact lens, and (b) decreases a strength of the resulting magnetic field on a side of the necklace away from the electronic contact lens; whereby (x) more power is inductively coupled to the electronic contact lens, and (y) less power is absorbed by a region of the wearer's body against which the necklace is worn.

15. The system of claim 14, wherein the first current that flows through the first conductive loop is greater than the second current that flows through the second conductive loop.

16. The system of claim 14, wherein the first conductive loop and the second conductive loop are concentric.

17. The system of claim 14, wherein the one or more driver circuits further comprises:
  a first driver circuit to drive the first current through the first conductive loop; and
  a second driver circuit to drive the second current through the second conductive loop.

18. The system of claim 14, wherein:
the necklace comprises a first surface configured to be placed against the body of the necklace wearer and a second surface opposite to the first surface and closer along the y-axis to the contact lens, and
the first conductive loop and the second conductive loop are between the first surface and the second surface of the necklace.

19. The system of claim 18, wherein the second conductive loop and the first surface of the necklace are separated by a threshold distance along the y-axis.

20. The system of claim 14, wherein the first conductive loop is connected in series with the second conductive loop, the first conductive loop and the second conductive loop wound in opposite directions from each other.

* * * * *